United States Patent [19]

Lisinski et al.

[11] Patent Number: 5,260,866
[45] Date of Patent: Nov. 9, 1993

[54] EXPERT CONFIGURATOR

[75] Inventors: Mark S. Lisinski, Rolling Meadows; Mario S. Fiorellino, Naperville; Mary G. Frandsen; Michael L. Frandsen, both of Clarenden Hills; Russell Chaney, Evanston; Greg T. Penn, Arlington Heigh, all of Ill.

[73] Assignee: Andersen Consulting, Chicago, Ill.

[21] Appl. No.: 761,270

[22] Filed: Sep. 17, 1991

[51] Int. Cl.⁵ .................. G06F 15/22; G06F 15/46
[52] U.S. Cl. .................. 364/401; 364/406; 364/408; 364/468
[58] Field of Search ........... 364/401, 406, 408, 469, 364/419

[56] References Cited

U.S. PATENT DOCUMENTS 4,847,761 7/1989 Ferriter et al.
4,875,162 10/1989 Ferriter et al. .................. 364/401

FOREIGN PATENT DOCUMENTS 0425405 5/1991 European Pat. Off.
8600735 1/1986 PCT Int'l Appl.
9100576 1/1991 PCT Int'l Appl.

OTHER PUBLICATIONS

Donald E. Brown, Expert Application Delivery, News 3X/400 (Nov. 1990).
XL/Datacomp Inc., Guide to Success for Make-To-Order Companies.
Info DB, vol. 5, No. 1, 1990, Iowa City, US pp. 2-12, XP000109360, N. Goodman, "Bill of Materials in Relational Database".
MAC-PAC for the IBM AS/400; Expert Configurator (1992).
Mark Lieberman, Knowledge-Based Techniques with RPG and CL, News 3X/400.
Mark S. Lisinski, Checking Up on the Expert, News 3X/400 (Nov. 1990).
Donald E. Brown, Expert Application Delivery, News 3X/400 (Nov. 1990).
"Amsoft Configurator".
"Friedman & Associates, Inc., the HFA ATO System".
"XL/Datacomp Inc., Guide to Success for Make-To-Order Companies".
J. D. Edwards & Co. proposed single-level expert configurator, Aug./Sep. 1991.
Richard W. Bourke, Configurators: Rule-Based Product Definition, APICS 51-54 (Dec. 1991).

Primary Examiner—Roy N. Envall, Jr.
Assistant Examiner—Frantzy Poinvil
Attorney, Agent, or Firm—Merchant, Gould, Smith, Edell, Welter & Schmidt

[57] ABSTRACT

A multi-level system generates multiple custom work orders for the manufacture of an end item and lower-level configurable items comprising the end item. The system includes an order entry configuration for obtaining option values that define specifications for the end item and lower-level configurable items. An options storage within the system stores the option values and parameters for generating work order requirements for the end item and lower-level configurable items. The system further includes a manufacturing configuration which, after the order entry configuration processes the option values, generates the multiple custom work orders by interactively accessing the options storage.

60 Claims, 39 Drawing Sheets

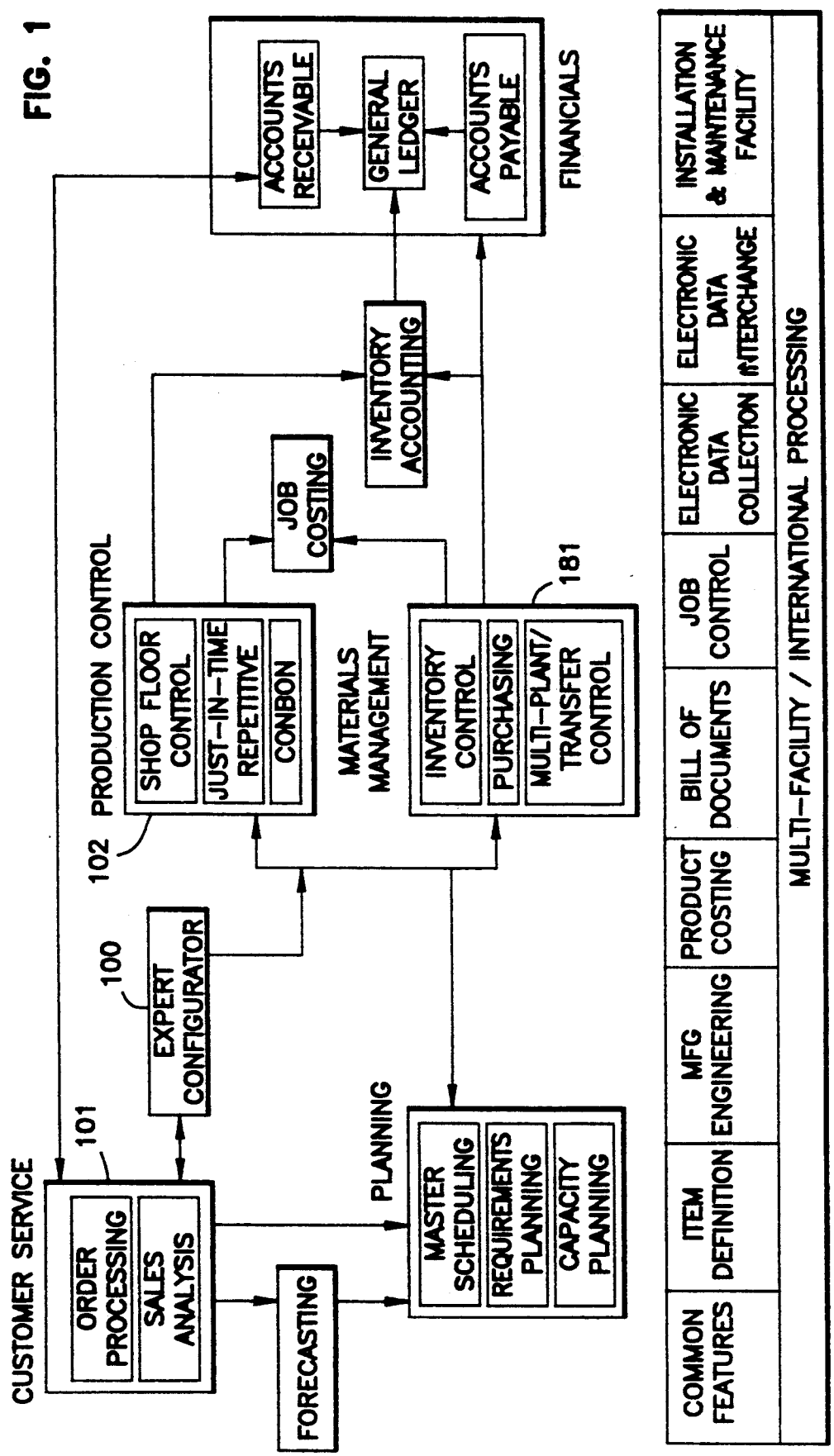

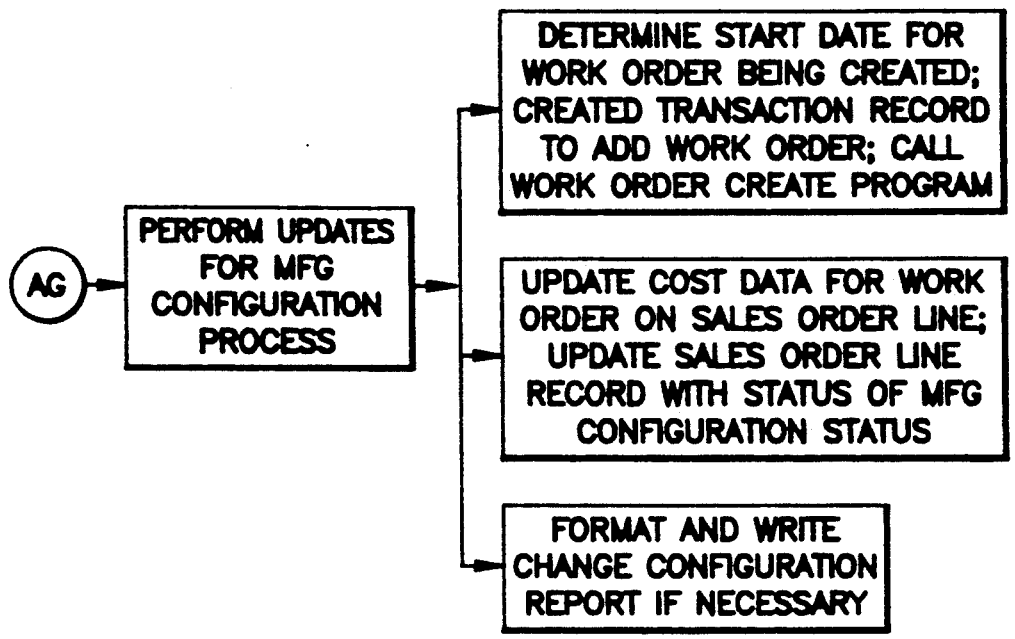
FIG. 19
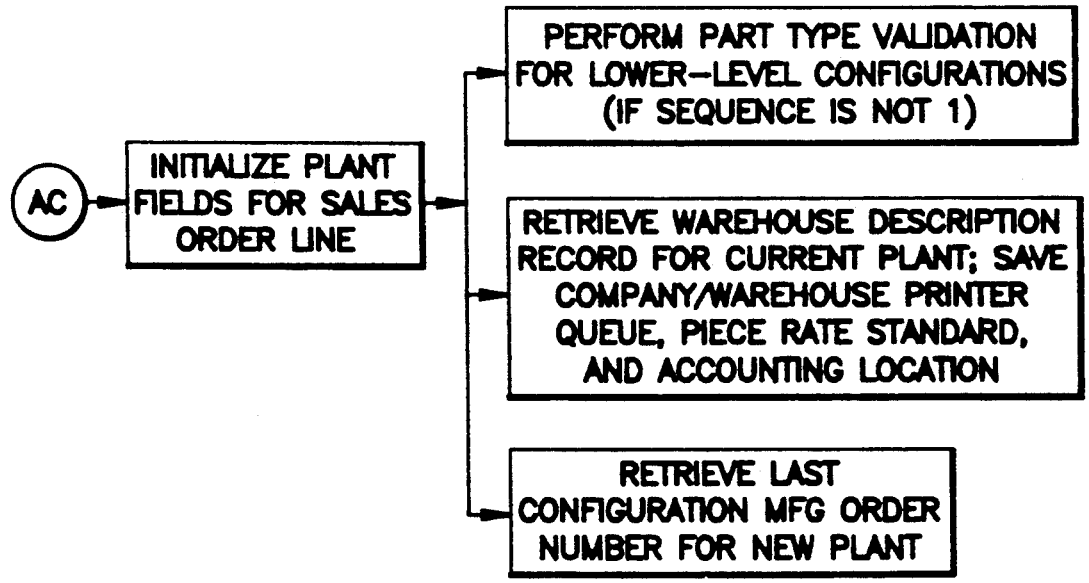

```
PTF    PLT  US2              EXPERT CONFIGURATOR                              9/13/91
DSP010704              SALES ORDER SCREEN RULE MAINTENANCE                    HEADER

RULE NUMBER S0010 00    QUESTION AND ANSWER SCREEN FOR CUSTOM SPEED BOAT  SEARCH
PART NUMBER SPX115      CUSTOM BUILT SPEED BOAT

VERSION 01              CREATION DATE 9/12/91        LAST UPDATE DATE 9/12/91

SCREEN TITLE            FEATURES AND OPTION SELECTION

RELEASING RULE          S0000 00                     RELEASING RULE RESULT  1

RETURN RULE                                          CURRENT RULE RESULT

HELP SCREEN      HS001000

RULE SEARCH 1  RULE SEARCH 2  RULE SEARCH 3  RULE SEARCH 4  RULE SEARCH 5

F3-EXIT                       F2-FAST PATH                  F5-DETAIL SCREEN
F9-ENTER INQUIRY              F10-SELECT FUNCTION           F15-REKEY DATA
```

FIG. 27

```
PTF  PLT US2              EXPERT CONFIGURATOR                              9/13/91
DSP010704         SALES ORDER SCREEN RULE MAINTENANCE                       DETAIL

RULE NUMBER 00010 00   QUESTION AND ANSWER SCREEN FOR CUSTOM SPEED BOAT
PART NUMBER SPX115         CUSTOM BUILT SPEED BOAT              VERSION  01

P
SQ OPTION  DESCRIPTION    C OPT DEF   DEFAULT VALUE       CAT TYP

5 XCOL    EXTERIOR COLOR  1  15      A WHITE               M
10 ICOL    INTERIOR COLOR  1  15      A                     M
15 TCOL    TRIM COLOR      1  15      A                     M
20 FEET    SIZE (IN FEET)  1   2  0   N              16     M
25 STEREO  STEREO          1   1      A Y                   R
30 SSEATS  SWIVEL SEATS    1   1      A Y                   R
                                                             +

F3=EXIT              F2=FAST PATH              F7=HEADER SCREEN
F9=ENTER INQUIRY     F10=SELECT FUNCTION       F15=REKEY DATA

FIG. 28
```

```
PTF  PLT US2                EXPERT CONFIGURATOR                        9/13/91
DSP010704              SALES ORDER RULE MAINTENANCE                    HEADER

RULE NUMBER      S010 0 00   CONFIGURED COMPONENT: CUSTOM STEREO IN PLANT US1

PART NUMBER      SPX115      CUSTOM BUILT SPEED BOAT              SEARCH

ACTION CODE      CC          CONFIGURED COMPONENT                 VERSION 01

RELEASING RULE   S0000 00    RELEASING RULE RESULT    1

RULE SEARCH 1      RULE SEARCH 2      RULE SEARCH 3      RULE SEARCH 4      RULE SEARCH 5

CREATION DATE       9/12/91
LAST UPDATE DATE    9/12/91

F3=EXIT                      F2=FAST PATH                    F7=HEADER SCREEN
F9=ENTER INQUIRY             F10=SELECT FUNCTION             F15=REKEY DATA
```

FIG. 29

```
PTF       PLT US2         EXPERT CONFIGURATOR                    9/13/91
DSP010704              SALES ORDER RULE MAINTENANCE                DETAIL
                          CONFIGURED COMPONENT

RULE NUMBER    S0100 00    PART NUMBER    SPX115    ACTION CODE CC VERS 01
CONDITION
(0"STEREO,EQ,"Y")

SEQ/PART NUMBER
01"XBAN001"

PLANT
"US1"

F3=EXIT                    F2=FAST PATH                F7=HEADER SCREEN
F9=ENTER INQUIRY           F10=SELECT FUNCTION         F15=REKEY DATA
```

FIG. 30

```
PTF                                                             9/13/91
DSP010704                                                        DEBUG

EXPERT CONFIGURATOR
                    EXPLANATION FACILITY

ORDER NUMBER    000831 00       LINE NUMBER 002
PART NUMBER     SPX115          SPEED BOAT
ORDER QTY         2.000         UM          EA
AC IN DEBUG

S RULE   NO RSLT   D  AC   RULE DESCRIPTION
  S0010  00 TRUE   D  CD   QUESTION AND ANSWER SCREEN FOR CUSTOM SPEED BOAT
  S0100  00 TRUE   D  SG   CONFIGURED COMPONENT; CUSTOM STEREO IN PLANT US1
  R0000  00 TRUE   D  CC   CONFIGURED COMPONENT; CUSTOM STEREO
  R0010  00 TRUE   D  CN   FIRST RULE: CUSTOM STEREO
  R0015  00 TRUE   D  SG   QUESTION AND ANSWER SCREEN FOR STEREO
  S0110  00 TRUE   D  GV   GLOBAL VARIABLE FOR COMPACT DISC SELECTED FLAG
  S0500  00 TRUE   D  CC   CONFIGURED COMPONENT; DASH BOARD
  S9999  99 TRUE   D  MO   SET THE CD PLAYER SELECTED FLAG FOR MFG
                   D  ED   END EXPLANATION FACILITY

F6=FOLD/TRUNCATE        FF=RULE DETAIL        F7=RELEASING DETAIL
                             FIG. 31
```

```
PTF                                              EXPERT CONFIGURATOR                                   9/13/91
DSP010704                                        EXPLANATION FACILITY                                  DEBUG

ORDER NUMBER     000831 00              LINE NUMBER 002
PART NUMBER      SPX115                 SPEED BOAT
ORDER QTY           2.000               UM             EA
AC IN DEBUT

S  RULE    NO   RSLT    D  AC        RULE DESCRIPTION
   R0015   00   TRUE    T  CD
                        D  GV        GLOBAL VARIABLE FOR COMPACT DISC SELECTED FLAG
   VARIABLE NAME                     CD
   VALUE                             Y                  RELEASING RULE R0000 00 AC CN
   S0110   00   TRUE    D  CC        CONFIGURED COMPONENT: DASH BOARD
   SEQ/PART NUMBER                   DASH-Q52C
   PLANT                             US2                RELEASING RULE S0000 00 AC CN
   S0500   00            D  MO       SET THE CD PLAYER SELECTED FLAG FOR MFG
   OPTION TO BE MODIFIED             CDFLAG
   NEW VALUE                         Y                  RELEASING RULE S0000 00 AC CN
   S9999   99   TRUE    D  ED        END EXPLANATION FACILITY

RELEASING RULE S0000 00 AC CN

F6=FOLD/TRUNCATE         F4=RULE DETAIL        F7=RELEASING DETAIL

FIG. 32
```

```
DATE      09/13/91                         PENNSKY MANUFACTURING COMPANY                                    PAGE   1
TIME      11:33:23                                                                                          PLANT  US2
REPORT    EC510A                          MANUFACTURING ORDER RULES TRACE          REQUESTOR

ORDER SELECTION   000831 00    LINE NUMBER 002

SALES ORDER       000831 00    LINE NUMBER 002    MANUFACTURING ORDER NUMBER U001242
PART NUMBER                    SPX115              CUSTOM BUILT SPEED BOAT
CONFIGURED PART NUMBER         SPX115              CUSTOM BUILT SPEED BOAT
PARENT PART NUMBER

AC              T                     EXPRESSION 1    T    EXPRESSION 2
RULE NO  RULE DESCRIPTION                     CD ACTION CODE DESCRIPTION  RSLT      1                RESULT          2    RESULT

S0000 00 FIRST MFG RULE FOR CUSTOM             DN CONDITION RULE           TRUE
         SPEED BOAT

S0010 00 COMPONENT REQUIREMENT FOR             CR COMPONENT REQUIREMENT    TRUE   A  B-115           N    1.000000
         STANDARD BOAT SHELL

S0015 00 COMPONENT REQUIREMENT FOR             CR COMPONENT REQUIREMENT    TRUE   A  XBAN001         N    1.000000
         STEREO

S0020 00 COMPONENT REQUIREMENT FOR             CR COMPONENT REQUIREMENT    TRUE   A  DASH-152C       N    1.000000
         CUSTOM DASH

S0025 00 COMPONENT REQUIREMENT FOR             CR COMPONENT REQUIREMENT    FALSE
         STANDARD DASH

**** END OF REPORT ****
```

FIG. 33

```
PTF      PLT US2              EXPERT CONFIGURATOR                    9/13/91
DSP010704                FEATURES AND OPTION SELECTION               OPTIONS

ORDER NUMBER        000831  00           LINE NUMBER 002
PART NUMBER         SPX115               SPEED BOAT    CUSTOM BUILT SPEED BOAT
ORDER QTY                 2.000              UM    EA

PART IN CONFIGURATION   SPX115        SEQ PP

EXTERIOR COLOR          WHITE
INTERIOR COLOR          BLUE
TRIM COLOR              GREEN
SIZE (IN FEET)          16
STEREO                  Y
SWIVEL SEATS            Y

F3-EXIT                 F15-REKEY DATA
```

FIG. 34

```
PTF         PLT US1        EXPERT CONFIGURATOR                         9/13/91
DSP010704                  STEREO OPTION SELECTION SCREEN              OPTIONS

ORDER NUMBER               000831         00       LINE NUMBER 002
PART NUMBER                SPX115                  SPEED BOAT
ORDER QTY                         2.000            UM       EA

PART IN CONFIGURATION      XBAN001                 SEQ 01    CUSTOM AM/FM STEREO

NUMBER OF SPEAKERS                                  2
DOLBY NOISE REDUCTION                               Y
COMPACT DISC                                        Y
CD DISK CAPACITY                                    1
SOFT TOUCH CONTROLS                                 N

F3-EXIT                                     F15-REKEY DATA
```

FIG. 35

```
PTF      PLT US2           EXPERT CONFIGURATOR                     9/16/91
DSP010704              PRICING MATRIX HEADER MAINTENANCE             CREATE

PART NUMBER            SPX115        CUSTOM BUILT SPEED BOAT

MATRIX NUMBER          PRCMX   MATRIX DESC BASE PRICE MATRIX

CURRENT VERSION        00

MATRIX TYPE            N

V
   SQ  C  VARIABLE NAME    DESCRIPTION           LG   D   T   M
       O                                                  N   -
       O                                              O   A   -
   1      FEET             SIZE (IN FEET)        2
   2      STEREO           STEREO                1

F2=FAST PATH                                F9=ENTER INQUIRY
F15=REKEY DATA

F3=EXIT
F10=RETURN TO PROMPT
```

FIG. 36

```
PTF         PLT US2        EXPERT CONFIGURATOR                    9/16/91
DSP010704              PRICING MATRIX DETAIL MAINTENANCE           DETAIL

X AXIS     SIZE (IN FEET)
Y AXIS     STEREO              N                    16           24

N            8000.000000    9000.000000       10000.000000
Y            8500.000000    9500.000000       10500.000000

F15-REKEY DATA          F18-DEACTIVATION           F19-REACTIVATION
F20-Y ADDITION          F21-X ADDITION             F24-MORE COMMAND KEYS
```

FIG. 37

EXPERT CONFIGURATOR

FIELD OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates to a multi-level system for dynamically configuring custom work orders for an end item and its lower-level configurable items comprising the end item.

BACKGROUND OF THE INVENTION

The construction and manufacturing of a product in a typical manufacturing environment requires a work order. The work order is a type of recipe that specifies component requirements and may optionally specify labor requirements for the product in an environment where a user desires to utilize labor requirements. The component requirements are the actual ingredients or parts that comprise the product. The labor requirements are the steps required to put together all of the ingredients or parts in order to construct the product.

A work order is created from a bill of material and optionally a routing. A bill of material is a listing of all the subassemblies, parts, and raw materials that go into a parent assembly or product showing the quantity of each required to construct the parent assembly. A routing typically contains the sequence of operations necessary to construct the parent assembly. The work order combines the necessary bill of material and optionally the routing for the construction of the parent assembly.

Products in make-to-order, assemble-to-order, and engineer-to-order environments usually have options available to a user, and these options may affect the specifications of the product and the content of a work order for the product. For example, in the manufacturing of a speed boat, a user has many choices about the features available for a particular speed boat. Each of these options may affect the work order required to construct the speed boat. In a typical manufacturing system, for every combination of features and options, a separate bill of material and optionally a routing is required to generate the work order. Even if there are only a few available options, the combinations of these options may easily amount to an unmanageable number of bills of materials and routings to cover each combination.

Manufacturing systems have been designed to dynamically create work orders so that a separate predefined bill of material and routing is not needed for each combination of options. Based upon a set of rules, the system may create work orders for a product by following the logic of the set of rules. This same set of rules may create work orders for all the combinations of options. The rules and logical associations of rules need only be defined once, which also eliminates the need for the users of the system to remember the logic and process involved in obtaining each option value and generating work orders.

These manufacturing systems typically only create one work order for a single end item or product. However, products often require multiple work orders because of options that are available for parts comprising end item. For example, a speed boat requires a custom work order for manufacturing the speed boat meeting the specifications defined by the user-selected options. The speed boat may also contain a stereo which has options available to the user. The user may choose, for example, a standard AM/FM stereo or an AM/FM stereo with a compact disk player.

A custom work order is desired for both the speed boat and the stereo, since both have options available to a user. Since the typical manufacturing system may only create one custom work order for the speed boat (the parent end item), the work order for this speed boat would have an ingredient simply identified as stereo. Therefore, the components of the stereo and the operation steps to assemble it would be listed with the components and operations for the speed boat instead of the stereo. A separate custom work order would be desired for the stereo, but would not be available because the system, being single-level, would not have the capability to generate a separate custom work order for that subassembly.

Furthermore, the options for one of the parts may affect the construction of another part within the same end item. For example, the type of stereo chosen by a user may affect the type of dashboard required in the speed boat. A stereo with a compact disk player may require a dashboard with more space for the stereo. However, the dashboard is an ingredient of the work order for the speed boat and is not logically tied in to the work order for the stereo. Without logically related these work orders, a manufacturer may have difficulty in resolving this type of situation.

Also, the manufacturer may construct both the product and parts within the product having options, such as the stereo, which means that the manufacturer needs multiple work orders for the products. For example, the manufacturer may need a work order for both the speed boat and the stereo. If the manufacturing sites for these two parts are in different geographical locations, as is often the case, the manufacturer may have difficulty organizing construction of a product in one location according to one work order and construction of a part for the product in another location according to another work order, especially since the work orders are not logically related within the manufacturing system.

The present invention solves these and other shortcomings of the prior art described above by providing for dynamic creation of multiple custom work orders for a single product or end item and its components. In one embodiment, the present invention may also assign these custom work orders for the subassemblies to different manufacturing sites.

The present invention also solves other shortcomings of the prior art which will become apparent to those skilled in the art upon reading and understanding the present specification.

SUMMARY OF THE INVENTION

The present invention is a multi-level system for generating multiple custom work orders for the manufacture of an end item and lower-level configurable items comprising the end item. The system includes a front end configuration for obtaining option values that define specifications for the end item and lower-level configurable items. An options storage within the system stores the option values and parameters for generating work order requirements for the end item and lower-level configurable items. The system further includes a manufacturing configuration which, after the front end configuration processes the option values, generates multiple custom work orders for the end item and the lower-level configurable items.

BRIEF DESCRIPTION OF THE DRAWINGS

In the drawings where like numerals refer to like components throughout several views, FIG. 1 is a general block diagram of a manufacturing planning and control system that incorporates the present invention.

FIG. 19 is a structure chart that shows the preferred flow of data through the process of performing updates for the manufacturing configuration and initializing the plant fields for the sales order line.

FIG. 27 represents a preferred user interface for entering header information for a screen generation rule.

FIG. 28 represents a preferred user interface for entering detail information for a screen generation rule.

FIG. 29 represents a preferred user interface for entering header information for a standard rule.

FIG. 30 represents a preferred user interface for entering detail information for a standard rule.

FIG. 31 represents a preferred user interface for displaying a trace of rules executed.

FIG. 32 represents a preferred user interface for displaying a trace of rules executed when the FOLD/TRUNCATE feature has been selected.

FIG. 33 represents a preferred display for reporting a trace of rules executed.

FIGS. 34 and 35 represent preferred user interfaces for displaying questions and answers.

FIG. 36 represents a preferred user interface for entering matrix header information.

FIG. 37 represents a preferred user interface for entering matrix detail information.

DETAILED DESCRIPTION OF THE PREFERRED EMBODIMENT

Figure 2A:
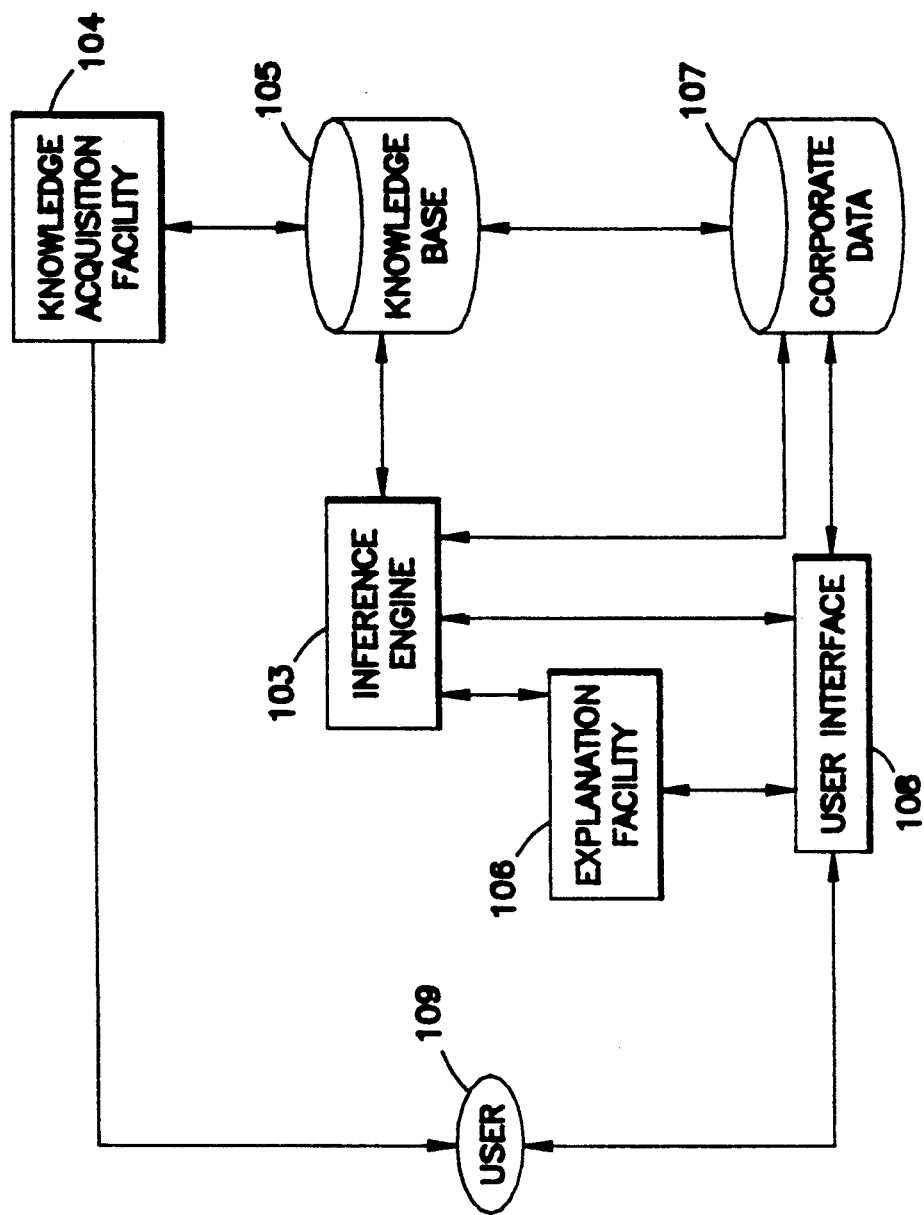
FIG. 2A is a general block diagram which shows the preferred elements of the present invention.

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

I. OVERVIEW

The present invention is a multi-level system for dynamically generating custom work orders for the manufacturing of an end item and lower-level items that comprise the end item. The lower-level items may typically be either standard parts or configured parts. A standard part may be a part for the end item which does not change with the user's options for the end item. The standard part, therefore, may have a standard bill of material and routing for constructing the part.

A configured part is dependent upon the user's options for that part or other configured parts. Therefore, a work order for the construction of the configured part will also depend upon the user's options as well as other data available to the system. In the preferred embodiment, the present invention dynamically generates a custom work order for the configured part based upon those options. The present invention also dynamically generates custom work orders for any other configured parts that comprise the end item, and the generation of each of these custom work orders is typically performed as a single process.

The options are typically parameters that define specifications for an end item and lower-level items. Options may be the user's answers to questions that the preferred system generates in order to determine the specifications. Options may also be values generated by the preferred system. One skilled in the art will recognize that there may also be other methods of entering option values into the system without departing from the scope of the invention. These other methods may include, for example, entering information from the corporate data module and calculated values derived from corporate data and options.

As an example to illustrate an application of the present invention, consider the construction of a speed boat. The speed boat is the end item. Various lower-level items comprise the end item. The lower-level items may be standard parts, such as the speed boat hull. Other parts, such as the engine and radio, are configured parts because the construction of these parts depends upon various choices or options available to the user. The user, for example, may choose a four or six cylinder engine, and the engine may also have the option of a turbocharger. Likewise, the user may have options available for the radio; for example, the user may be able to choose a standard AM radio, an AM/FM radio, or a radio with a compact disk player. The preferred system will present the user with questions regarding these configured parts in order to obtain the option values or specifications necessary to generate a work order.

When the preferred system encounters a configured component rule during the course of obtaining option values, the system obtains all of the option values and then pricing information for the configured part before returning to the process of obtaining option values for the parent item. If during the process of obtaining option values for a configured part, the system encounters additional configured component rules, the system obtains option values and then pricing information for any additional configured parts throughout multiple levels until the system reaches a level with no configured parts.

The specifications for a configured part may affect the construction of other parts, and the preferred system has the capability to consider the effects of configured part specifications on other parts.

For example, the radio for the speed boat in the above example may also be a configured part because of the options available to the user. Additionally, the user's option for which type of radio is desired may affect the type of dashboard that is used in the speed boat, since a radio with a compact disk, for example, may be larger than a standard AM/FM radio and thus require more space in the dashboard. The dashboard may be a configured part, but the user does not have any choices about the type of dashboard that will be used in the construction of the speed boat because the options for the radio dictate how the dashboard will be constructed. However, since the type of radio selected by the user may affect the type of dashboard required, the preferred system will dynamically generate a work order for the correct dashboard corresponding to the options selected by the user for configured parts, such as the radio.

Figure 2B:
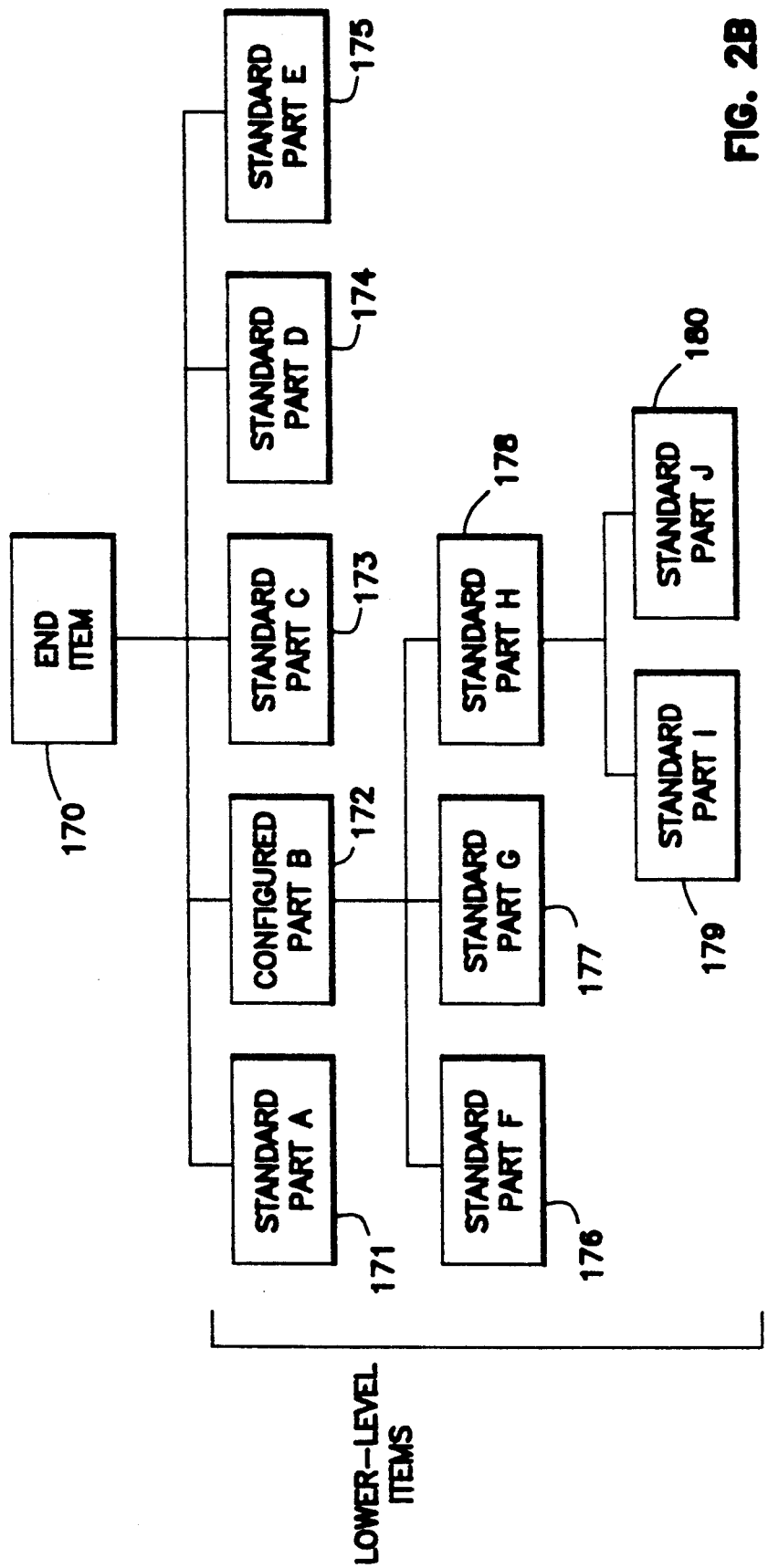
FIG. 2B is a conceptual block diagram of a sample bill of materials which shows both configured components and standard components as lower-level items.

The multi-level aspect of the present invention may also be illustrated conceptually by the bill of materials as shown in FIG. 2B. In the bill of materials, an end item 170, such as a speed boat, is comprised of a number of lower-level items 171-175. These lower-level items may typically be either standard or configured parts. In this bill of material, the end item 170 has standard parts 171 and 173-175 at a first level of construction. The first level also includes a configured part 172. At a second level of construction, the configured part 172 is comprised of standard parts 176 and 177, and configured part 178. Configured part 178 is comprised of standard parts 179 and 180 at a third level of construction.

The preferred system may generate custom work orders for parts at various level of construction, such as is shown in FIG. 2B. In a forward chaining process, the preferred system uses bills of rules to obtain options for the configured parts and to generate the custom work orders. A bill of rules is a set of rules in a logic tree which control processing of data. A standard part may have a standard bill of material, since the part typically does not change with the user's options and choices. The configured parts, however, require custom work orders because the construction of these parts will depend on the options for the parts as may be determined from the user's choices.

When the preferred system encounters a configured part rule during obtaining option values, the system suspends processing of the current bill of rules and executes the bill of rules for the configured part. After the preferred system has obtained the option values for the configured part, processing returns to the previous bill of rules.

As applied to the conceptual illustration shown in FIG. 2B, the preferred system would first begin processing a bill of rules to obtain option values for the end item 170. When the preferred system encounters a rule that identifies that part 172 is configured, the system suspends processing of the end item's bill of rules and begins processing a bill of rules to obtain option values and pricing information for configured part 172. This process is initiated by a configured component rule, which is explained below.

Since configured part 172 also contains a configured part, the preferred system will suspend processing of the bill of rules for configured part 172 when the system encounters a rule that identifies that part 178 is configured. The preferred system will then transfer control to the processing of a bill of rules for configured part 178. When this is complete, the preferred system will return control to where the system had suspended a bill of rules before processing the bill of rules for configured part 178. Therefore, the preferred system will return to processing the bill of rules for configured part 172. Finally, when the preferred system has completed processing this bill of rules, processing returns to the bill of rules for the end item 170.

The preferred system uses arrays and pointers to maintain the correct chain of processing so that the system knows where to return processing within a suspended bill of rules when processing is returned to the suspended bill of rules. Even though only three level of bills of rules are shown in FIG. 2B, the preferred system may process bills of rules for configured parts throughout additional levels by utilizing the same recursive process.

Using the process of transferring control among multiple bills of rules, the preferred system achieves a logical flow of questioning and answering in a multi-level configuration. For example, when a user is entering information for the speed boat, the user may enter all information for the radio when the user is at that option, instead of having to enter all information for speed boat and then enter information for the radio.

The present invention is typically used in a complete manufacturing planning and control system, such as is illustrated in FIG. 1. The expert configurator 100 illustrated in FIG. 1 incorporates the present invention. The expert configurator 100 interfaces the customer service module 101 with the production control module 102 and materials management module 181 in the manufacturing planning and control system as shown. Other types of systems may incorporate the present invention without departing from the scope of the invention.

The expert configurator 100 is initiated from the customer service module 101 and may subsequently begin a process of receiving information. Based on this information, the expert configurator generates information necessary to generate custom work orders for the end item and lower-level items, and the expert configurator delivers this information to the production control module 102 and the materials management module 181 to be used in the construction of the end item and lower-level items.

While the present invention as embodied in expert configurator 100 is initiated by and receives information from customer service module 101, a customer service module is not required for operation of the present invention. The customer service module may have many additional features that are utilized by the expert configurator but are not essential nor required for any function of present invention.

FIG. 2A shows a more detailed block diagram of a preferred embodiment of expert configurator 100. Expert configurator 100 may be implemented as a knowledge-based system as illustrated by FIG. 2A. A knowledge base 105 contains the rules that define the tasks and functions performed by the preferred system.

An inference engine 103 is at the heart of the preferred system. Inference engine 103 controls the firing and execution of the rules in knowledge base 105. This process is explained in detail below. Corporate data 107 contains actual data used by the rules in the knowledge base 105. An explanation facility 106 may track rules that are processed and display those rules to a user. A knowledge acquisition facility 104 is used for creating and defining the rules in knowledge base 105. Finally, a user 109 interacts directly with knowledge acquisition facility 104 to define rules, and the user may interact with other elements of the preferred system through a user interface 108.

II. KNOWLEDGE BASE

The rules contained within knowledge base 105 of the preferred system define tasks performed by the system during the course of, among other things, obtaining option values and generating custom work orders. The rules are designed to capture and represent the knowledge of experts so that the rules define actions to be taken based upon the occurrence of a condition. These actions based on conditions represent the actual decision making process of a human expert. For example, a rule may define the following action: if a user selects the luxury option for a speed boat, then use leather interior in the speed boat. The implementation and structure of the rules is explained in more detail below. Furthermore, one skilled in the art will recognize the purpose and use of rules in a knowledge-based system.

The rules contained in knowledge base 105 of the preferred system may be defined as shown in Tables 1–14. In Tables 1–14, "valid rule categories" refers to the rules categories—order entry, pricing, and manufacturing—with which the rule may be associated, and each of these three rule categories is a database type; "description" is a user-defined text description of the action expressions; "expression type" refers to whether the expression type is syntax or non-syntax (text or screen); "length" indicates the allowable length of the expression in the preferred system to be entered by the user; "interpreted type" refers to the type of result, either alphanumeric, numeric, or logical (true-false), after the syntax expression has been interpreted; and "note" simply indicates any special considerations for the rule.

The rule type (order entry, pricing, and manufacturing) indicates the type of task performed by the rule. Order entry rules are used primarily to obtain the option values that define specifications for the end item and lower level items. Pricing rules are used primarily to generate a custom price for the end item. Manufacturing rules are used primarily to generate the custom work orders for constructing and manufacturing the end item and lower-level items.

TABLE 1

CONDITION RULE

Explanation:
A Condition Rule may be used to control the releasing and processing of subsequent rules. Rules may be grouped together with a Condition Rule and released based upon the interpretation of the condition in the corresponding Condition Rule. The rules controlled by a particular Condition Rule are typically released when the condition of the corresponding Condition Rule is satisfied.

Valid Rule Categories:
Order entry, pricing, manufacturing.
Interpreted Type: Logical
A Condition Rule normally does not have action expressions.

© 1991 ANDERSEN CONSULTING
All Rights Reserved

TABLE 2

START DEBUG RULE

Explanation:
A start debug rule typically identifies a starting point within the rule base to begin tracing the forward chaining process and initiates the explanation facility.

Valid Rule Categories:
Order entry, pricing.

Action Expression 1:
Description: Rule type to trace. Identified by action code.

TABLE 2-continued
START DEBUG RULE

| | |
|---|---|
| Expression Type: | Non-syntax (text). |
| Length: | 25 |
| Interpreted Type: | Not interpreted. |
| Note: | This rule may contain up to eight action codes to be traced. |
| | Action Expression 2: |
| Description: | User-defined debug screen title, appears on the debug screen when it is displayed. |
| Expression Type: | Non-syntax (text). |
| Length: | 25 |
| Interpreted Type: | Not interpreted. |

© 1991 ANDERSEN CONSULTING
All Rights Reserved

TABLE 3
SCREEN GENERATION RULE

Explanation:
A screen generation rule defines information required to generate an option select screen. which, in the preferred embodiment, is used to obtain the option values in order to generate the custom work orders for the end item and lower-level items.

Valid Rule Categories:
Order entry.
A screen generation rule typically does not contain a condition statement. Normally, a screen rule definition screen is used in place of a condition and expression detail screen.

© 1991 ANDERSEN CONSULTING
All Rights Reserved

TABLE 4
CONFIGURED COMPONENT RULE

Explanation:
A configured component rule typically initiates multi-level, multi-plant configuration by specifying that a lower-level component will be configured, which requires the generation of a custom work order for the lower-level component. In the preferred system, this rule identifies which parts will receive a configured manufacturing order and in which plant the configured part will be constructed. When the preferred system encounters this rule, processing of the bill of rules for current component is suspended while the system retrieves the rules for processing the configured component identified by the Configured Component Rule.

Valid Rule Categories:
Order entry.

| | Action Expression 1: |
|---|---|
| Description: | Part number. |
| Expression Type: | Syntax. |
| Length: | 320 |
| Interpreted Type: | Alphanumeric. |
| Note: | In the preferred system, the part identified must be on the Part Master file; the part must be defined as a manufactured or build-through part in the plant identified in Action Expression 2; and, if the plant in Action Expression 2 differs from the plant or the rule, then this part must also be defined as a Transfer Part in the rules plant. |

TABLE 4-continued
CONFIGURED COMPONENT RULE

| | Action Expression 2: |
|---|---|
| Description: | Plant. |
| Expression Type: | Syntax. |
| Length: | 320. |
| Interpreted Type: | Alphanumeric. |
| Note: | This must be a valid plant. |

© 1991 ANDERSEN CONSULTING
All Rights Reserved

TABLE 5
SCREEN VALIDATION RULE

Explanation:
A screen validation rule typically is used to identify invalid option values or combinations of option values. When the preferred system encounters an invalid option or combination of option values, a Screen Validation Rule will display a user-defined error message to the user so that the situation may be rectified. Invalid option values will be based upon the limitations and constraints of the particular item being configured by the preferred system.

Valid Rule Categories:
Order entry.

| | Action Expression 1: |
|---|---|
| Description: | Error message to be displayed on the user-defined option selection screen when a screen validation condition is satisfied. |
| Expression Type: | Non-syntax (text). |
| Length: | 55 |
| Interpreted Type: | Not interpreted. |
| Note: | In the preferred system, the error message will appear on the option select screen executed prior to the screen validation rule. |

© 1991 ANDERSEN CONSULTING
All Rights Reserved

TABLE 6
MODIFY OPTION RULE

Explanation:
A modify option rule may be used to change the value of a user entered option or to generate an option value. The option value generated by this rule typically is used for subsequent rule processing.

Valid Rule Categories:
Order entry, mfg, pricing.

| | Action Expression 1: |
|---|---|
| Description: | Option value to be modified. |
| Expression Type: | Non-syntax (text). |
| Length: | 15 |
| Note: | Must be an existing option value defined for a Process Screen Generation Rule. |
| | Action Expression 2: |
| Description: | New value of the option. |
| Expression Type: | Syntax. |
| Length: | 320 |
| Interpreted Type: | If modifying an option, should be identical to the option being modified. |
| Note: | In the preferred system, if modifying an existing option, the interpreted type of the new option value must be identical to that of |

TABLE 6-continued

MODIFY OPTION RULE the original option value.

© 1991 ANDERSEN CONSULTING
All Rights Reserved

TABLE 7

SECONDARY VARIABLE RULE

Explanation:

A secondary variable rule may be used as a work field to temporarily store a value for subsequent use by the preferred system. Each secondary variable may only be accessed by a particular data structure or bill of rules within the preferred system. However, the same secondary variable can be accessed by the order entry and pricing rules of a single configuration of a part.

Valid Rule Categories:

Order entry, pricing, manufacturing.

Action Expression 1:

| | |
|---|---|
| Description: | Name of the secondary variable. |
| Expression Type: | Non-syntax (text). |
| Length: | 15 |
| Interpreted Type: | Not interpreted. |
| Note: | User-defined name for the secondary variable. |

Action Expression 2:

| | |
|---|---|
| Description: | Value of the variable (work field). |
| Expression Type: | Syntax. |
| Length: | 320 |
| Interpreted Type: | Logical, alphanumeric, or numeric. |
| Note: | The value entered may be alphanumeric or numeric. |

© 1991 ANDERSEN CONSULTING
All Rights Reserved

TABLE 8

GLOBAL VARIABLE RULE

Explanation:

A global variable rule functions as a work field for temporarily storing a value, and this rule may store a value that can be accessed by multiple data structures or bills of rules in the preferred system. The rule is thus used for sharing of data among varying data structures and rules in the preferred system for the generation of all of the custom work orders. Sharing of data preferably occurs within either (1) all order entry and pricing rules within the front end configuration of an end item and its configured components; or (2) all manufacturing rules within the back end configuration of an end item and its configured components.

Valid Rule Categories:

Order entry, pricing, manufacturing.

Action Expression 1:

| | |
|---|---|
| Description: | Name of the global variable. |
| Expression Type: | Non-syntax (text). |
| Length: | 15 |
| Interpreted Type: | Not interpreted. |
| Note: | User-defined name for the global variable. |

Action Expression 2:

| | |
|---|---|
| Description: | Value of the variable (global work field). |
| Expression Type: | Syntax. |
| Length: | 320 |
| Interpreted Type: | Logical, alphanumeric, or numeric. |

TABLE 8-continued

GLOBAL VARIABLE RULE

| | |
|---|---|
| Type: | |
| Note: | The value entered may be alphanumeric or numeric. |

© 1991 ANDERSEN CONSULTING
All Rights Reserved

TABLE 9

PRICE DETAIL RULE

Explanation:

In the preferred system, a price detail rule generates a price detail record, which contains detailed component price values that may comprise the final price. The price components are preferably associated either with an option value or with a user-defined price component description. This rule may be used for generating standard reports that contain the detailed description of various price components of a product's price.

Valid Rule Categories:

Pricing.

Action Expression 1:

| Size | Name | Description |
|---|---|---|
| 2 | Sequence number | User-defined number used to specify the order in which price elements will be printed on the report. The same sequence number may be used more than once. |
| 1 | Print code | Indicates the standard reports where price detail information will be printed. |
| 1 | Option flag | Indicates if the price detail is associated with an option value. |
| up to 25 | Option name for price description | If the price detail is associated with an option value, enter the option name. If the price detail is not associated with an option value, enter a description of the price detail. |

| | |
|---|---|
| Expression Type: | Non-syntax. |
| Length: | 30 |
| Note: | The segments of this expression are preferably entered without any separating spaces between the segments. |

Action Expression 2:

| | |
|---|---|
| Description: | Value of the price component. |
| Expression Type: | Syntax. |
| Length: | 320 |
| Interpreted Type: | Numeric. |
| Note: | In the preferred embodiment, the interpreted expression must result in a positive number. |

© 1991 ANDERSEN CONSULTING
All Rights Reserved

TABLE 10

FINALIZED PRICE RULE

Explanation:

TABLE 10-continued
FINALIZED PRICE RULE

In the preferred embodiment, a finalized price rule generates the final price of an end item based upon all price calculations. After the price is finalized, this rule enters the finalized price into a database for the preferred system.

Valid Rule Categories:

Pricing.

Action Expression 1:

| | |
|---|---|
| Description: | The value of the final price of the end item. |
| Expression Type: | Syntax. |
| Length: | 320 |
| Interpreted Type: | Numeric |
| Note: | In the preferred embodiment, the interpreted expression must result in a positive number. |

© 1991 ANDERSEN CONSULTING
All Rights Reserved

TABLE 11
COMPONENT REQUIREMENT RULE

Explanation:

In the preferred embodiment, a component requirement rule generates the component requirements for a particular manufacturing work order. The components are the actual parts used in building the lower-level items and end item.

Valid Rule Categories:

Manufacturing.

Action Expression 1:

| | |
|---|---|
| Description: | The usage code, scrap factor, and component part required for the manufacturing work order of the configured parent part. The usage code (one character) and scrap factor (two characters) must be entered literally and cannot be interpreted. The component may be in the form of an expression. |
| Expression Type: | Syntax. |
| Length: | 320 |
| Interpreted Type: | Alphanumeric. |
| Note: | This part must be on the Part Master File. |

Action Expression 2:

| | |
|---|---|
| Description: | The quantity of the component part required to manufacture one configured parent part. |
| Expression Type: | Syntax. |
| Length: | 320 |
| Interpreted Type: | Numeric. |
| Note: | The quantity must be a positive number. |

© 1991 ANDERSEN CONSULTING
All Rights Reserved

TABLE 12
LABOR REQUIREMENT RULE

Explanation:

In the preferred embodiment, a labor requirement rule generates the labor requirements for a manufacturing work order. The labor requirements are normally the actual steps and operations required to construct a configured component.

Valid Rule Categories:

Manufacturing.

Action Expression 1:

TABLE 12-continued
LABOR REQUIREMENT RULE

| | |
|---|---|
| Description: | Operation number, operation line number, and the comment number used to identify the operation to be selected for the manufacturing work order. |
| Expression Type: | Syntax. |
| Length: | 320 |
| Interpreted Type: | Alphanumeric. |
| Note: | In the preferred embodiment, the operation number, operation line number, and comment number must exist on the routing that is used for the configured components. The routing used normally is either the routing of the configured part or the rule base routing parts routing. If non-zero line or comment number is issued, a zero line or comment number normally must also be issued. |

Action Expression 2:

| | |
|---|---|
| Description: | The piece rate for standard operations or the fixed time load for fixed operations. The piece rate may be either the number of pieces made per hour or the number of hours required to manufacture a piece depending on a plant-wide standard. The number of hours may be labor hours or machine hours. |
| Expression Type: | Syntax. |
| Length: | 320 |
| Interpreted Type: | Numeric. |
| Note: | Must be a positive number. |

© 1991 ANDERSEN CONSULTING
All Rights Reserved

TABLE 13
GENERATE COMMENT RULE

Explanation:

A generate comment rule may be used to generate user-defined comments to be associated with the custom work orders.

Valid Rule Categories:

Manufacturing.

Action Expression 1:

| | |
|---|---|
| Description: | Destination of the comment for distribution. |
| Expression Type: | Non-syntax (text). |
| Length: | 25 |
| Interpreted Type: | |
| Note: | The destination is user-defined; the comments generated report may be manually distributed to the destinations specified and are automatically printed with manufacturing paper work. |

Action Expression 2:

| | |
|---|---|
| Description: | User-defined comment. |
| Expression Type: | Non-syntax. |
| Length: | 250 |
| Interpreted Type: | |
| Note: | The comment may be entered exactly as it will appear in the comments generated report in the preferred system. |

© 1991 ANDERSEN CONSULTING
All Rights Reserved

TABLE 14

END DEBUG RULE

Explanation:

An end debug rule typically identifies an ending point within a bill of rules to end tracing of rules. In addition, the end debug rule causes the display of the explanation facility data gathered since the execution of a Start Debug Rule.

Valid Rule Categories:

Order entry, pricing.

There are typically no action expressions used in an end debug rule.

© 1991 ANDERSEN CONSULTING
All Rights Reserved

III. RULE PROCESSING

A. Rule Definition

The preferred system uses the rules to perform actions to accomplish the functions and goals of the system. The rules are flexible so that a user may define the action that the rules will perform for a variety of manufacturing environments. Therefore, a user may control the actions within the rules and how the rules are logically associated so that the same set of rules may be adapted to generate custom work orders for any number of product permutations.

Each rule in the preferred system is identified by a rule number and rule action. A rule number may comprise a prefix and a suffix. Since all rules fired by a single rule are processed sequentially by rule number, a user may group rules by the prefix and suffix numbers.

Each rule in the preferred system may have a rule header and rule detail. Rule header information defines the general descriptive data of the rule and may include: Part Number; Rule Description; Rule Version; Search Keys; Releasing Data; Returning Data; Help Screen (Screen Generation Rules only); and Screen Title (Screen Generation Rules only).

The Part Number defines the parts on which a particular rule may perform an action. The Part Numbers available to the rules may be defined as shown in Table 15.

TABLE 15

| Part Number | Parts to which the rule applies |
| --- | --- |
| *ALL | All configured parts |
| Group Name | All parts within a group of parts |
| Subgroup Name | All parts within a subgroup of parts |
| Part Number | The specific configured part |

© 1991 ANDERSEN CONSULTING
All Rights Reserved

The part numbers are more fully explained below.

The part types on which each type of rule may operate may be defined as shown in Table 16.

TABLE 16

RULE TYPES ALLOWED

| Part Types | Sales Order Entry Rules | Pricing Rules | Mfg. Rules |
| --- | --- | --- | --- |
| Purchased part | X | X | |
| Manufactured part (MRP) | X | X | X |
| Manufactured part (JIT) | X | X | |
| Raw material | X | X | |
| Planning part | | | |
| Reference part | X | X | |
| Build-thru part (MRP) | X | X | X |
| Build-thru part (JIT) | X | X | |
| Non standard part | X | X | |

© 1991 ANDERSEN CONSULTING
All Rights Reserved

Each rule may also contain a version number. This allows a user to define different sets of rules by version number. The rules which the preferred system uses are those rules having a version corresponding to the current part number, group number, and subgroup number.

B. Rule Syntax

Rule detail information defines the syntax of the rules. Syntax is the structure used to construct the rule detail, and the rule detail information defines a specific action that each rule will perform.

The preferred embodiment of the present invention utilizes screen generation rules and standard rules. Screen generation rules define information for a screen or user interface, which may be used to enter option values into the system. Unlike a standard rule, a screen generation rule uses screen rule definition fields and does not have condition and action expressions.

Each standard rule comprises a condition expression and zero to two action expressions. After a rule is released, the inference engine only executes the action expression of the rule if the condition has been satisfied.

The preferred system contains three types of expressions for use in the rules: syntax expression; text type expression; and screen detail expression (screen generation rules only). Text type expressions and screen detail expressions are not interpreted by the preferred system. Text type expressions are defined by a user and may be, for example, error messages or comments. A user may utilize screen detail expressions to define option-select screens. Option-select screens are one method of entering option values into the preferred system. One skilled in the art will recognize that other methods of entering or generating option values for the preferred system are possible without departing from the scope of the present invention.

Screen details expressions may contain, but are not limited to, the non-syntax data as shown in Table 17.

TABLE 17

SCREEN DETAIL EXPRESSIONS

| Field | Definition |
| --- | --- |
| Sequence Number | Order the options will appear on the screen. |
| Option Name | Name of the option, which may be used to identify the option. |
| Option Name Screen Field Heading | Name to appear on the option-select screen. |
| Option Length | Number of characters in the option field. |
| Print Code | Used to determine the documents where sales order options will be printed. |
| Option Decimal | Number of decimal positions for numeric Precision options. |
| Option Attribute | Whether the entered data will be numeric or alphanumeric. |
| Default Value | Any valid default value. |
| Reference File | Category to validate entry |

TABLE 17-continued

SCREEN DETAIL EXPRESSIONS

| Field | Definition |
|---|---|
| Category | against. |
| Option Type | Specifies the entry responsibility. Possible values may be: (1) MANDATORY: user must enter a value; (2) REQUIRED YES/NO: user must enter either Y or N; and (3) OPTIONAL: user is not required to enter an option value. |

© 1991 ANDERSEN CONSULTING
All Rights Reserved

Syntax expressions contain the actions which are interpreted and executed by the inference engine. Each syntax expression is comprised of one or more basic syntax expressions. Each basic syntax expression may be defined as shown in expression [1]:

N(V1,OP,V2)  [1]

In expression [1], N is an optional negation character, V1 is the first variable, OP is the operand, and V2 is the second variable. The inference engine executes the expression by processing the variables (V1, V2) according to the function defined by the operand (OP). The negation character (N) is available because the preferred system does not have a "not equal to" operand. In order to perform the "not equal to" function, an expression may use the "equal to" operand in conjunction with the negation character. The negation character may also be used with other logical operands to perform a NOT function of the operand, such as "not less than" (negation character used with "<") or "not greater than" (negation character used with ">").

An example of a syntax expression is illustrated in expression [2]:

(O-LUXURY,EQ,"Y")  [2]

Expression [2] will cause its corresponding rule to have a true condition if a user has selected the luxury option. The expression means: is the luxury option (O-LUXURY) entered by the user equal to (EQ) yes ("Y"). If the user has entered the luxury option, the rule incorporating this expression will be true, and the preferred system will fire all rules released by this rule when the releasing result is true.

A syntax expression may be comprised of multiple basic expressions. This may be illustrated by the example as shown in expression [3]:

((V1,OP1,V2),OP3,(V3,OP2,V4))  [3]

The inference engine processes multiple expressions according to the standard rules of algebra. For example, in expression [3], first variables V1 and V2 are processed according to the function of operand OP1, and variables V2 and V3 are processed according to the function of operand OP2. Next, the results of these two operations are processed according to the function of operand OP3.

A detailed explanation of the rule syntax particular to each action code (type of rule) is discussed above in the tables of rules, Tables 1-14.

C. Variables

1. Internal Variable

The Internal Variable is a variable that may be used in, but is not limited to, the following files of the preferred system: Part Master, Customer Master, Sales Order Header, Sales Order Line, and Warehouse Balance. The internal variable typically operates on system data, such as data in corporate data module 107. The variable may be used in the processing of the order entry, pricing, and manufacturing rules.

2. Option Variable

In the preferred system, the Option Variables define the actual parameters of the end item and lower-level items. These variables may be defined by the user's answers to the questions in the order entry mode. The answers represent the user's choices with respect to the various types of available end items and lower-level items. These variables may also be defined by the preferred system as default values.

3. External Program Variable

The External Program Variable contains the name or identifier of an external program which may be called by the rule and used in processing. This variable allows the preferred system to use external programs for complex tasks, which may facilitate maintaining short rules with simple syntax.

When a rule calls an external program, the preferred system calls the program, and the result value determined by the program is returned to the expression in the rule for use in processing. The external program is not restricted to a specific language or process. However, the external program must have the capability to communicate with the preferred system. This may be accomplished, for example, by a parameter list.

4. Secondary Variable

The Secondary Variable typically operates as a temporary working storage field for a user-defined value within a bill of rules. The value within the working storage field may only be accessed by a particular data structure or bill of rules. For example, a secondary variable may define a value used only with the pricing rules, which could be a cumulative total price for the end item. Data may be shared by both the order entry rules and pricing rules for the same bill of rules associated with that secondary variable. Also, a secondary variable that relates only to a particular configured component may be used with only the data structure which defines that occurrence of that configured component and the bill of rules for configuring the component.

5. Global Variable

The Global Variable normally operates as a temporary working storage field for multiple bills of rules and assists the preferred system in achieving multi-level configuration. Unlike the Secondary Variable, multiple bills of rules may access the value stored within the Global Variable. Therefore, the rules used for defining and configuring all of the configured components may interact and share information between different configured components. Sharing of data preferably occurs within either (1) all order entry and pricing rules within the front end configuration of an end item and its configured components; or (2) all manufacturing rules within the back end configuration of an end item and its configured components.

This allows the preferred system to generate, for example, system-defined option values corresponding to items for which the user has no options but which are affected by the user's answers (options) for other items. An example of this type of item is a dashboard in a speed boat. The user has no options for the dashboard, but the user's options for other items, such as the radio, will affect the type of dashboard required in the speed boat.

6. Validation Table Variable

The Validation Table Variable may be used to define tables of valid options and features for the end item and lower-level items. The preferred system uses these validation tables to verify that the options or answers entered by the user define a valid product. Certain option values may result in an end item or level items that are incapable of manufacture and construction. The validation tables provide an efficient method of validating option values.

7. Matrix Variable

The preferred system may use Matrix Variables for obtaining result parameters which may alphanumeric or numeric, based upon values or combinations of values, used during the multi-level configuration process. A matrix is a multi-dimensional table which may have, for example, one to five variables as input keys to the table. The table contains a unique result value corresponding to each combination of the input keys. Matrices may be used with any type of rules in the preferred system that utilizes variables.

Matrices typically are divided into a matrix header and matrix detail. The matrix header may contain the matrix number, part number, matrix database type, active version number, valid database type of result fields, number of input keys, definition of each key, and access mode. The valid key types may be Option, Internal, Global Variables, and Secondary Variables. The key type, size, and decimal precision preferably will match in order to prevent unexpected results.

The matrix detail may contain the actual data of the matrix. This data typically defines the valid combination of the keys and the result field values corresponding to those combinations. Many versions of the data may exist within a matrix. However, in the preferred system, only one version may be active at any given time. The versions of data normally are activated by the matrix header.

The access mode within the matrix header typically will have three valid entries: equal to (=), less than or equal to (<), and greater than or equal to (>). The access mode, as determined by a user, defines how resultant data will be retrieved from a matrix, based upon the relationship between the combination of input keys and the data within the matrix. For example, if the access mode is "equal to," then the matrix will only provide a valid result value when a particular combination of input keys is equal to a valid combination of keys. As another example, a user may define a single matrix to retrieve a price, in which the input keys are quantities and the access mode is "less than or equal to." This example may further be illustrated by the matrix as shown in Table 18.

TABLE 18

PRICE MATRIX EXAMPLE

| Quantity | Price |
| --- | --- |
| 0 | 100 |
| 10 | 200 |
| 20 | 300 |

TABLE 18-continued

PRICE MATRIX EXAMPLE

| Quantity | Price |
| --- | --- |
| 30 | 400 |

© 1991 ANDERSEN CONSULTING
All Rights Reserved

If a user enters an order with a quantity of eight, the preferred system returns a price of $100. The system compares the input key of eight with the matrix data (quantity values). Since the matrix data of zero is less than or equal to the input key of eight, the value returned is a price of $100. If the access mode were "equal to," then the system only returns a value when an input key is actually equal to one of the matrix data values. Therefore, if a user entered eight, and the access mode were "equal to," the system would return an error message that the price was not found.

8. Multiple

The Multiple Options Table allows the preferred system to check for an occurrence of a particular value within a rule statement. The Multiple Options Table is thus a table containing all of the values to be checked in rule statements. For example, a user may define a Multiple Options Table to contain all of the ingredients for a particular work order. By using this table, the preferred system may check the table for an occurrence of a specific user-defined ingredient. The Multiple Options Table eliminates the need for a separate statements to compare the value to be checked individually against each value within the list of values.

D. Groups, Subgroups, and *ALL

The preferred system allows many parts to be grouped together for similar processing without requiring duplication of a single rule for each particular part to be processed. When a rule is released, if the bill of rule's part is in the group, then the rule will be fired.

The *ALL statement may be used to substitute all parts for a part number in a rule header. The *ALL statement may be used in a rule to specify that the rule will be processed for any configured part if the rule is released. This provides for greater efficiency in the rules by eliminating the need to create a rule for all of the configured parts that utilize a rule's definition when that rule is operating on all configured parts.

Parts may further be organized into groups and subgroups. All parts are automatically assigned to the *ALL category. A part must be assigned to a group before it may be assigned to a subgroup. The groups and subgroups of parts may be defined by a user in the Part Master Maintenance conversation. Groups, Subgroups, and *ALL also have version numbers, which may be defined in the Reference File Maintenance. The version number determines which version of a particular group will be processed.

Matrices may also be defined for a group, subgroup, and *ALL. Therefore, a common matrix may be shared among many parts without having to duplicate the matrix for each particular part within a group. Matrices are uniquely defined by matrix name, part number, and database type. The preferred system refers to matrices only by name and contains a hierarchical ordering for resolving conflicts when two or more matrices have the same name and database type.

E. Operands

The rules in the preferred system use operands to perform operations on the variables described above. The types of variables in the preferred system may be defined as shown in Table 19. The operands in the preferred system may be defined as shown in Table 20.

TABLE 19

| VARIABLE TYPE DESCRIPTION | |
|---|---|
| L | Logical (false or true) |
| A | Alphanumeric |
| N | Numeric |
| M | Multiple variable table |
| T | Validation Table |

© 1991 ANDERSEN CONSULTING
All Rights Reserved

TABLE 20

| OPERANDS | | | | |
|---|---|---|---|---|
| Default Operand Codes | Meaning | Valid Types (V1,V2) | Result Type | Nature of Operation |
| LT | Less than | (N,N) | L | (V1 < V2) |
| LE | Less than or equal | (N,N) | L | (V1 <= V2) |
| + | Addition | (N,N) | N | (V1 + V2) |
| − | Subtraction | (N,N) | N | (V1 − V2) |
| / | Division | (N,N) | N | (V1 / V2) |
| × | Multiplication | (N,N) | N | (V1 × V2) |
| GT | Greater than | (N,N) | L | (V1 > V2) |
| GE | Greater than or equal | (N,N) | L | (V1 >= V2) |
| = | Equal to | (L,L) | L | (V1 = V2) |
|   |   | (A,A) | L |   |
|   |   | (N,N) | L |   |
| RD | Round Down | (N,N) | N | (V1 RD V2) =(V1 / V2) × V2 Note: Integer Division |
| RU | Round Up | (N,N) | N | (V1 RU V2) =((V1/V2) × V2 = V2 if remainder is not zero. Note: Integer Division |
| C1 | Concatenate one character | (A,A) (A,N) | A A | (V1 C1 V2) V1 concatenated with the first alphanumeric character or the first non-decimal numeric character of V2. |
| C2 | Concatenate two characters | (A,A) (A,N) | A A | (V1 C2 V2) V1 concatenated with the first two alphanumeric characters or the first two non-decimal numeric characters of V2. |
| C3 | Concatenate three characters | (A,A) (A,N) | A A | (V1 C3 V2) V1 concatenated with the first three alphanumeric characters or the first three non-decimal numeric characters of V2. |
| C4 | Concatenate four characters | (A,A) (A,N) | A A | (V1 C4 V2) V1 concatenated with the first four alphanumeric characters or the first four non-decimal numeric characters of V2. |
| EM | Element of Multiple Option table | (A,M) (N,M) | L | (V1 EM V2) V1 = 0 where 0 is an operation in the multiple option table identified by V2. |
| 5EL | Element of Validation Table | (A,T) | L | (V1 EL V2) V1 − V(i) where V(i) is a variable within the validation table identified by V2. |
| & | Logical AND | (L,L) | L | (V1 & V2) True if V1 is true and V2 is true; otherwise false. |
| OR | Logical OR | (L,L) | L | (V1 or V2) False if V2 is false and V2 is false, otherwise true. |
| IF | Logical IF | (A,L) (N,L) | A | (V1 IF V2) |
| SA | Substring after | (A,N) | A | (V1 SA V2) Result will be all characters from V1 after and including the position identified by V2. |
| SB | Substring before | (A,N) | A | (V1 SB V2) Result will be all characters from V1 before and including the position identified by V2. |

NOTE: All variables that are numeric must be positive numbers in the preferred system.
© 1991 ANDERSEN CONSULTING
All Rights Reserved

F. Forward Chaining

Figure 3A:
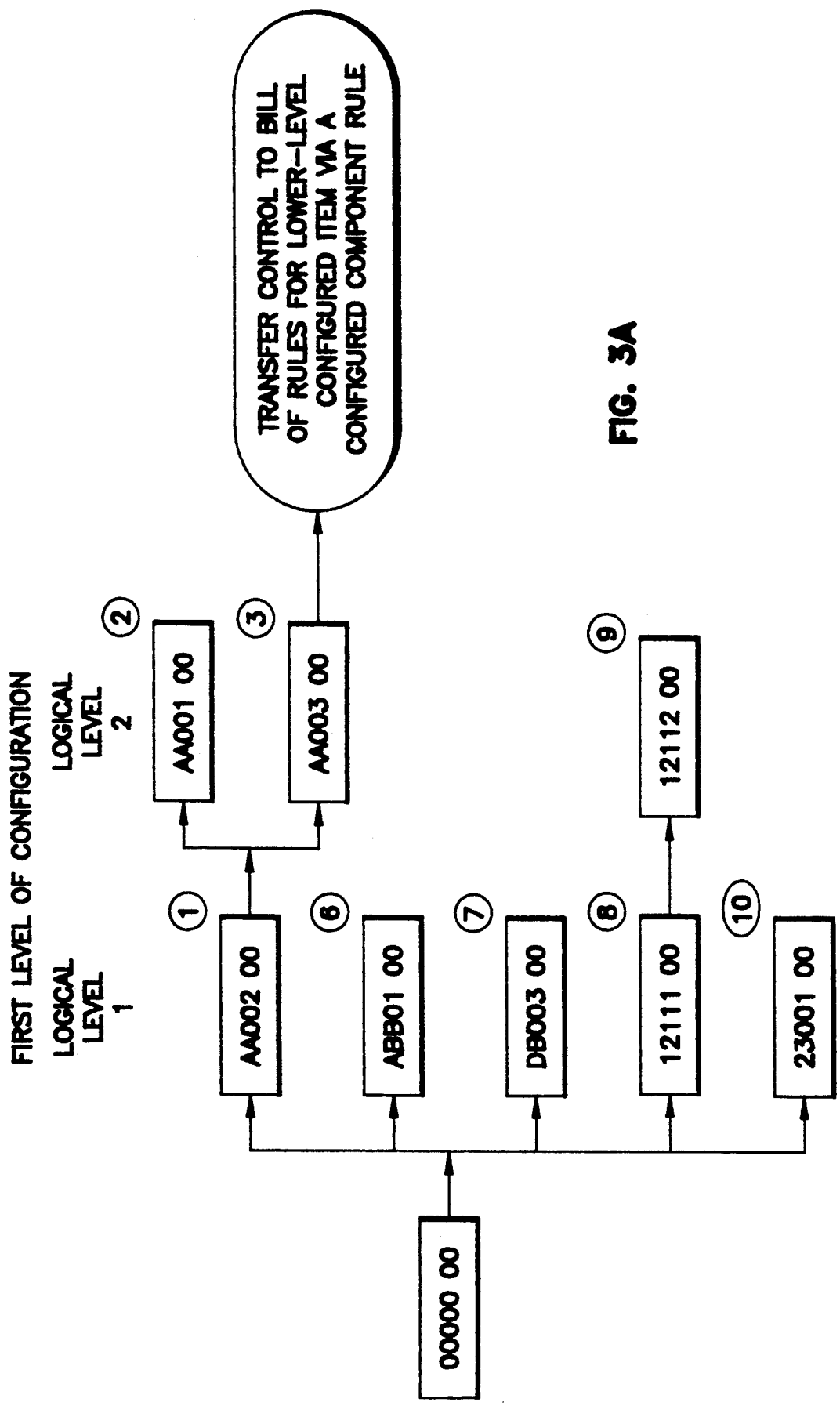
FIGS. 3A and 3B are a conceptual illustration of the process of forward chaining of rules throughout multiple levels of configuration.
Figure 3B:
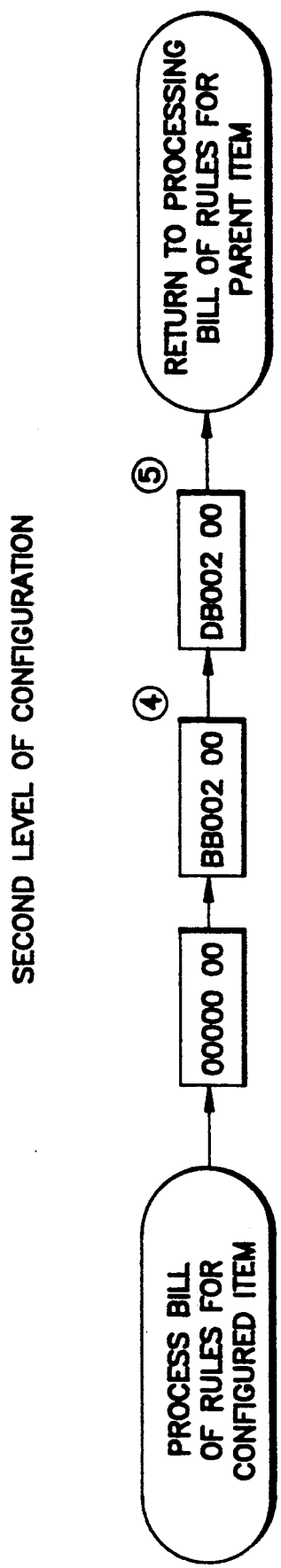

The process of forward chaining or rules, as initiated and controlled by the inference engine in the preferred system, is illustrated conceptually in FIGS. 3A and 3B. The inference engine controls the firing and execution of rules in the forward chaining process. The preferred system fires a rule when the releasing condition of the releasing rule is satisfied. After a rule is released, the preferred system will only execute the action contained within the rule when the condition in the rule is satisfied. If a rule has no condition, referred to as a blank condition, the preferred system interprets the rule condition as true. This logical process of firing (releasing) rules and executing rules continues until a predetermined goal state is achieved.

In the preferred system, one goal state may be the completion of obtaining all of the answers and option values that define an end item and lower-level items and generating a price for the end item. The inference engine may logically associate the order entry rules with one another by controlling how the rules are fired and released. The pricing rules may be similarly associated with one another. This logical grouping of rules is referred to as a logic tree. The logic tree results in a process of releasing and executing the order entry rules until the system has all of the option values required to generate the custom work orders and to generate a price for the end item.

Another goal state in the preferred system may be the generation of the custom work orders, based upon the data available, which may include option values, for the end item and lower-level items. The inference engine may create a logic tree by logically associating manufacturing rules together by controlling how the manufacturing rules are released and fired. The manufacturing rules, as controlled by the inference engine through a logic tree, may be fired and executed until the custom work orders have been generated.

The logic tree as shown in FIGS. 3A and 3B illustrates this process of forward chaining in an example having two levels of configuration. This example uses the following ten rules: AA001 00, AA002 00, AA003 00, ABB01 00, BB002 00, DB002 00, DB003 00, 12111 00, 12112 00, and 23001 00. The virtual rule (00000 00) is the main firing rule which begins all processing and, while not defined on the system, it is implied as a true condition in the logic tree. The virtual rule has no releasing rule. These rules may be organized into a logic tree as defined in FIGS. 3A and 3B.

A rule may release more than one other rule. When more than one rule is released in the preferred system, the released rules are processed in sequential order by rule number. A rule number may contain both letters and numbers, and rules with letters are processed before numbers.

The logic tree as shown in FIG. 3A has two levels. The virtual rule releases rules AA002 00, ABB01 00, DB003 00, 12111 00, and 23001 00. The first rule in sequence among these rules is AA002 00. Therefore rule AA002 00 is executed first. Rule AA002 00 releases rules AA001 00 and AA003 00. All of these rules released throughout the logic levels by rule AA002 00 are processed before the next rule in the sequence (ABB01 00) at logic level one is processed. The rules released by rule AA002 00 are processed in sequential order.

Rule AA003 00 may identify a lower-level configured item, causing the preferred system to suspend the processing of the current bill of rules in the first level of configuration. This may be accomplished by the configured component rule of the preferred system (see Table 4). Next, the system transfers control to the processing of the bill of rules for the configured item in the second level of configuration as shown in FIG. 3B. In the second level, the virtual rule releases rule BB002 00, which in turn releases rule DB002 00. After rule DB002 00 is processed, the system has completed processing of the bill of rules for this configured item. Processing is then transferred back to the parent bill of rules in the first level of configuration as shown in FIG. 3A.

Since there are no more rules to process in the chain of rules released by rule AA002 00, the inference engine now processes the next rule in the sequence (ABB01 00) at logic level one. The sequential processing of rules released at logical level one continues. The inference engine processes Rule DB003 00 after rule ABB01 00. Next, the inference engine processes rule 12111 00, and the rule that it releases (12112 00). Finally, the inference engine processes the last rule (23001 00) released by the virtual rule.

In summary, the inference engine would process the rules of this example in the order as shown in Table 21.

TABLE 21

FORWARD CHAINING EXAMPLE
ORDER OF RULE PROCESSING

| First level of configuration. | |
|---|---|
| i. virtual rule | |
| 1. AA002 00 | |
| 2. AA001 00 | |
| 3. AA003 00 | (first bill of rules is suspended) |
| Second level of configuration. | |
| ii. virtual rule | |
| 4. BB002 00 | (processing is transferred to the second level of configuration to process the second bill of rules) |
| 5. DB002 00 | |
| Return to first level of configuration. | |
| 6. ABB01 00 | (processing is returned to the first bill of rules) |
| 7. DB003 00 | |
| 8. 12111 00 | |
| 9. 12112 00 | |
| 10. 23001 00 | |

© 1991 ANDERSEN CONSULTING
All Rights Reserved

IV. INFERENCE ENGINE

Inference engine 103 in the preferred system controls the firing and execution of rules. Inference engine 103 is divided into a front end configuration 110 and back end configuration 111. The front end configuration 110 includes the order entry configuration and pricing configuration. The order entry configuration controls the order entry rules in order to obtain option values for the end item and lower-level items. The pricing configuration controls the pricing rules in order to generate a custom price for the end item. Front end rules refers to both the order entry rules and pricing rules.

The purpose of the order entry rules in expert configurator 100 is to obtain option values required by the expert configurator to generate custom work orders. Order entry configuration, therefore, refers to the process of obtaining the option values. A order entry configuration may contain additional features in conjunction with obtaining option values, such as the ability to enter information about customers, but these additional features are not required for the operation of the present invention.

The back end configuration 111 includes the manufacturing configuration. The manufacturing configuration controls the manufacturing rules in order to generate the custom work orders for the end item and lower-level items. Back end rules refers to manufacturing rules.

The preferred structure of the front end configuration is shown in FIGS. 4–7. The preferred structure of the back end configuration is shown in FIGS. 15–23. Both the front end and back end configurations incorporate and use a retrieve rules function, the preferred structure of which is shown in FIGS. 8–14.

In these diagrams, the preferred system processes the steps from left to right and top to bottom across the structure charts. When the preferred system encounters a step in a first level, that step, and all steps linked to that step throughout the levels, are executed before the preferred system performs the next step in the first level.

This same process controls the processing of other steps in other levels in the diagrams. The retrieve rules function, in addition to being processed in this manner, is shown as a forward chaining process.

Table 22 defines the abbreviations used in the structure charts.

TABLE 22

| ABBREVIATION | MEANING |
|---|---|
| ASYNC | Asynchronous. |
| CFGITN | Next Configured Item Flag. |
| CFGITM | Configured Item Flag. |
| CNFG | Configuration. |
| DBGSTS | Debug Status. |
| MFG | Manufacturing. |
| PGMSTS | Program Status. |
| PMODE | Process Mode. |
| PPL | Program Parameter Lists. |
| PRVCFG | Flag indicating whether to return to a Previously Configured parts bill of rules. |
| PS | Program Status. |
| SCHSTS | Search Status. |
| TRAN | Transaction. |

© 1991 ANDERSEN CONSULTING
All Rights Reserved

A. Front End Configuration

1. Files

The files used by the front end rules may be defined as shown in Tables 23 and 24. The front end rules are not limited to these files, and the front end rules may utilize different or additional files to perform functions of the front end configuration. In addition, these files may be used for purposes other than those described.

TABLE 23

| FRONT END CONFIGURATION INPUT FILES | |
|---|---|
| File Name | Description |
| Customer Master | Used to process internal variables for customer information |
| Part Master | Used to retrieve the configuration data for the part, and for internal variables. |
| Screen Rules Detail Master | Used to retrieve detail screen rule information. |
| Matrix Header Master | Used to retrieve matrix header information for rule processing. |
| Matrix Detail Master | Used to retrieve matrix detail information for rule processing. |
| Internal Variables | Used to retrieve variables referenced in rules which exist on the Part Master File Sales Order Line File, Warehouse Balance Files, Sales Order Header File, or the Customer Master File. |
| Sales Order Options Audit Trail | Used to store the before image of the Sales Order Options File records for use in option DEFAULTING in change mode. |
| Quote Order Option Audit Trail | Used to store the before image of the Sales Order Options File records for use in option DEFAULTING in change mode. |
| Quote Order Line Work | Used to store the quote order line being configured. |
| Active/Valid Rules by Releasing Rule | Used to retrieve rules used for processing. Does not contain inactive or invalid rules. |
| Warehouse Balance | Used to process internal variables for inventory information. |
| Sales Order Header | Used to retrieve sales order header information and for internal variables. |
| Quote Order Header | Used to retrieve quote order header information for internal variables. |
| Reference | Used to retrieve the date format, file status codes, group and subgroup information. |
| Error Message | Used to retrieve error messages. |

© 1991 ANDERSEN CONSULTING
All Rights Reserved

TABLE 24

| FRONT END CONFIGURATION UPDATE FILES | |
|---|---|
| File Name | Description |
| Sales Order Options | Used to process a sales order line item and configured components according to the features and option selected. |
| Quote Order Options | Used to process a quote order line item and configured components according to the features and options selected. |
| Sales Order Line | Used to store the sales order line being configured. |

© 1991 ANDERSEN CONSULTING
All Rights Reserved

2. Processing Structure

Figure 4:
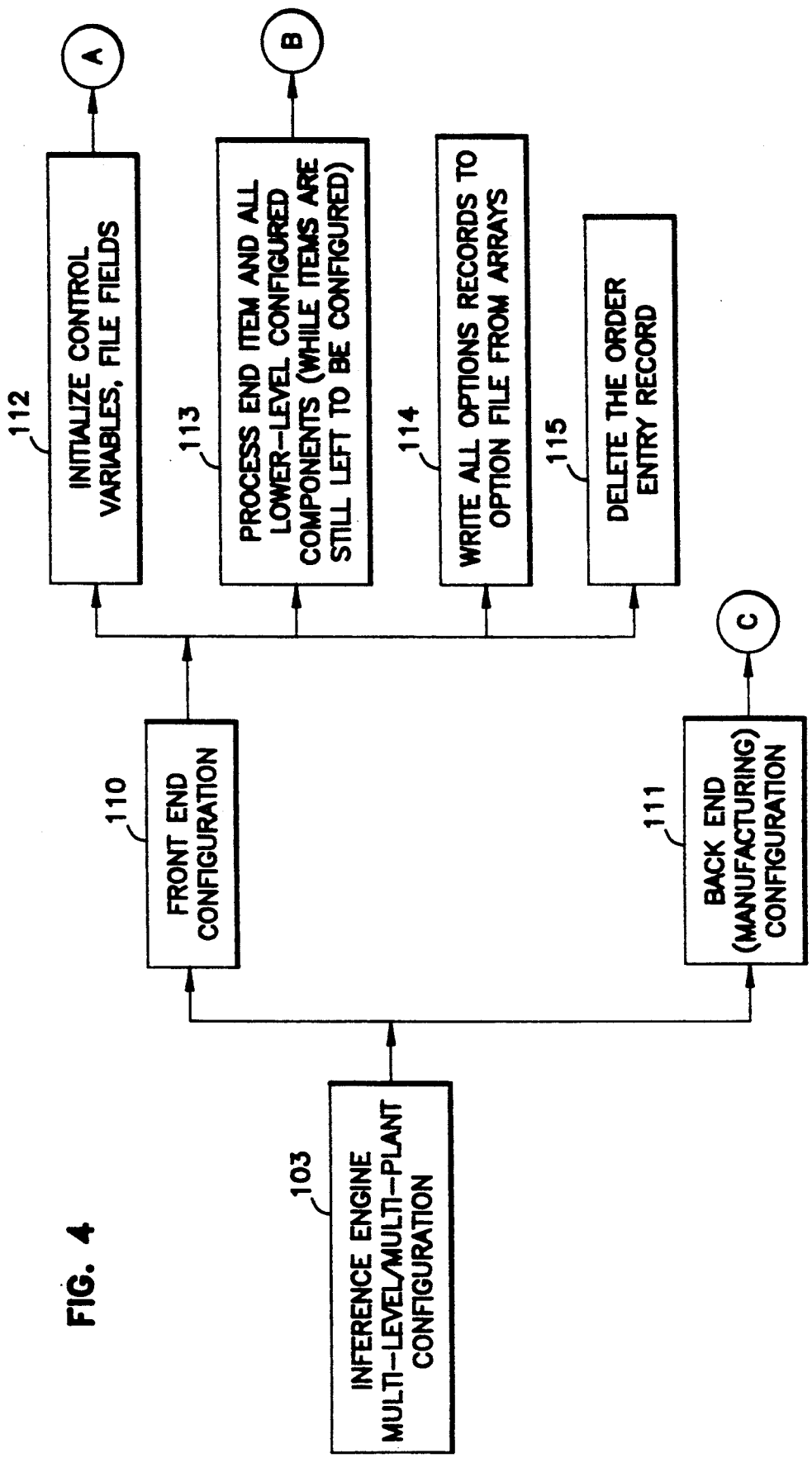
FIG. 4 is a structure chart that shows the preferred flow of data through the front end configuration.
Figure 5:
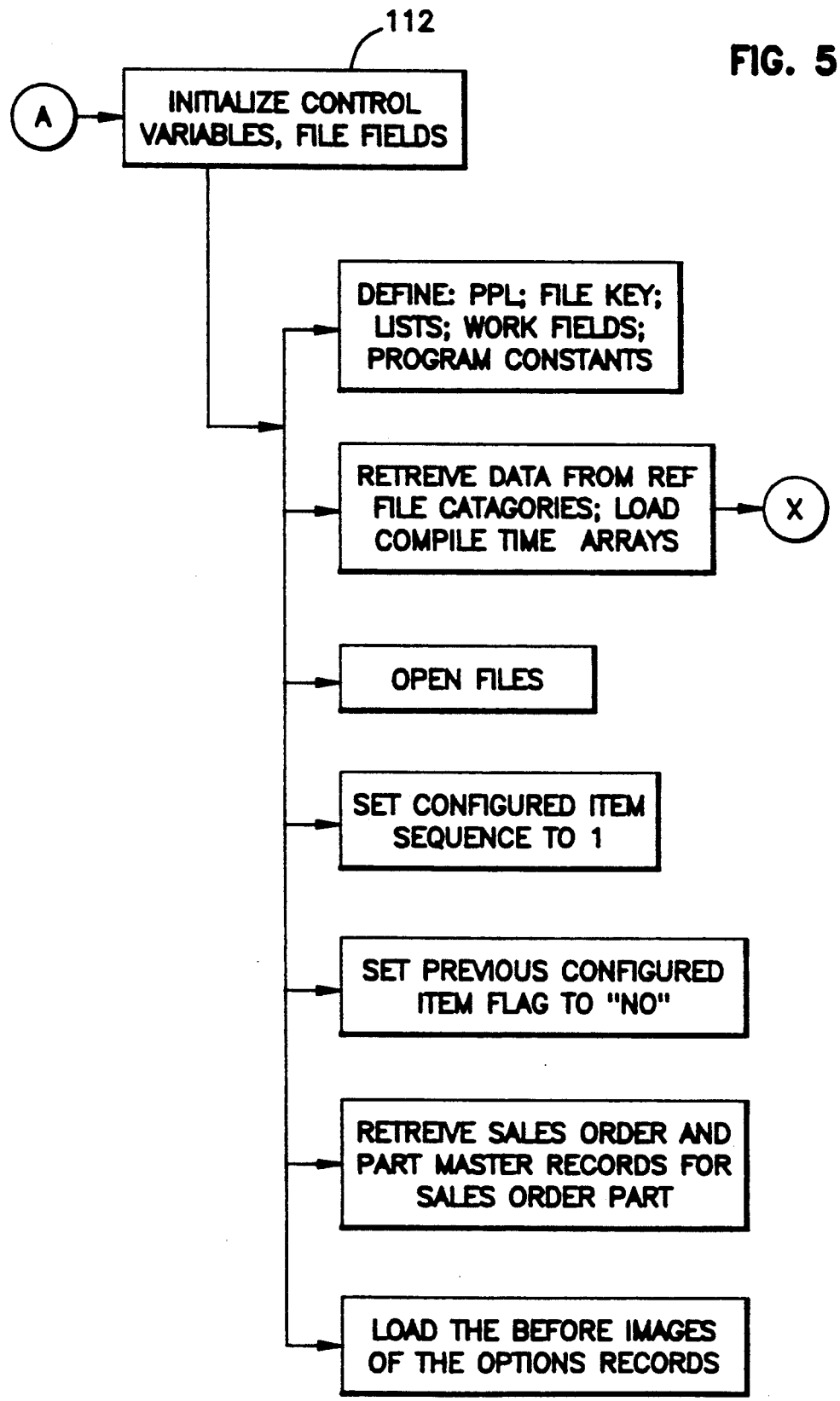
FIG. 5 is a structure chart that shows the preferred flow of data through the process of initializing control variables and file fields.

The preferred system implements the front end configuration 110 as illustrated in the structure diagrams as shown in FIGS. 4–7. A preferred user interface for displaying questions and answers in the process of obtaining option values may be illustrated as shown in FIGS. 34 and 35. Other methods of obtaining option values may be available, such as rule-determined option values, without departing from the scope of the invention. Referring to FIG. 4, the front end configuration 110 first initializes control variables and file fields at step 112. The initialization process is illustrated in the structure chart as shown in FIG. 5.

When the preferred system begins processing the end item or encounters a configured component (lower-level item), the front end configuration 110 processes the end item and all lower-level configured components at step 113. This is the primary step in obtaining option values that define the configurable end item and all configured lower-level items, and in generating a custom price for the end item. After the completion of processing step 113, the front end configuration writes the option values obtained and generated to a file at step 115. Finally, the front end configuration deletes the order entry work file record at step 115.

Figure 6:
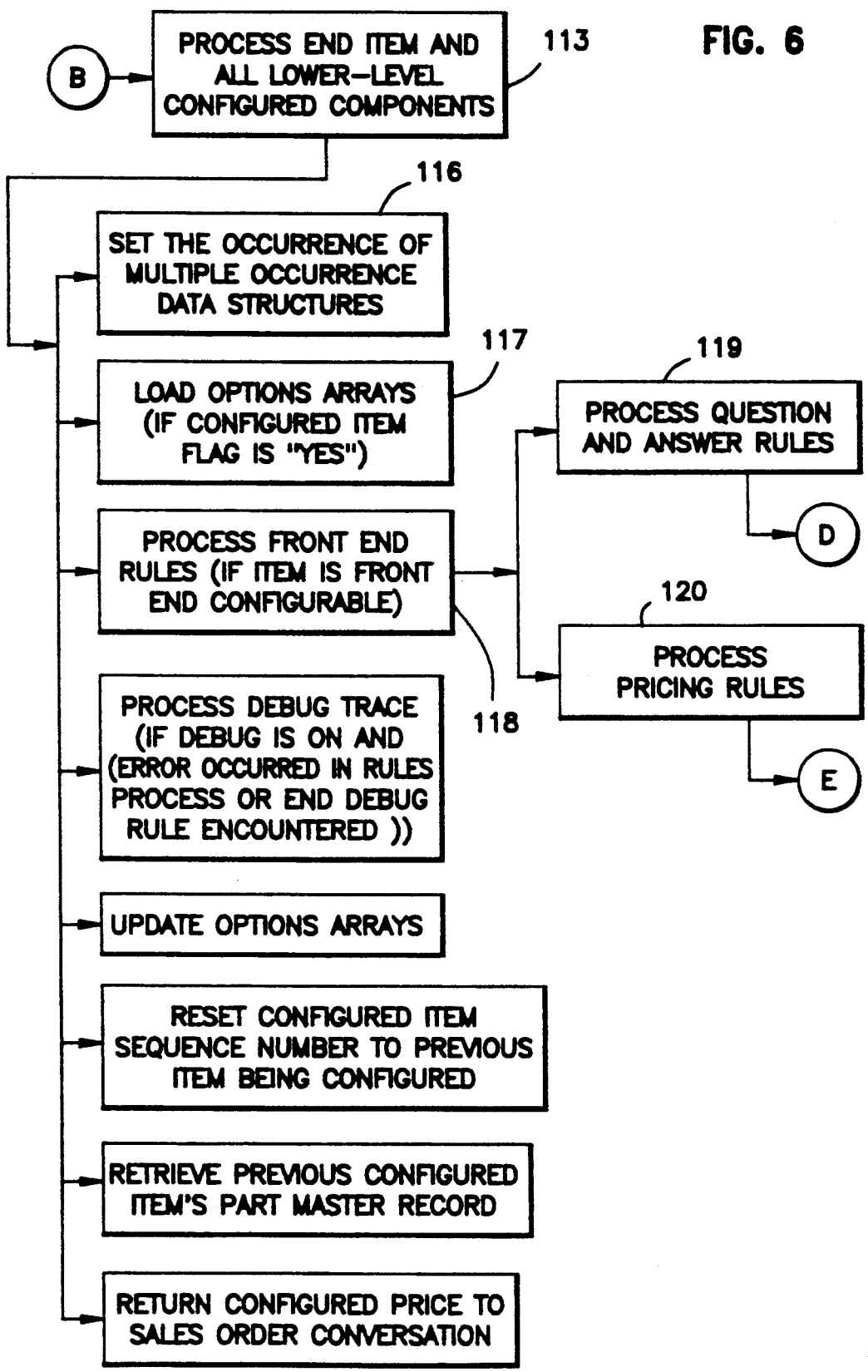
FIG. 6 is a structure chart that shows the preferred flow of data through the processing of end items and all lower-level configured components.
Figure 7:
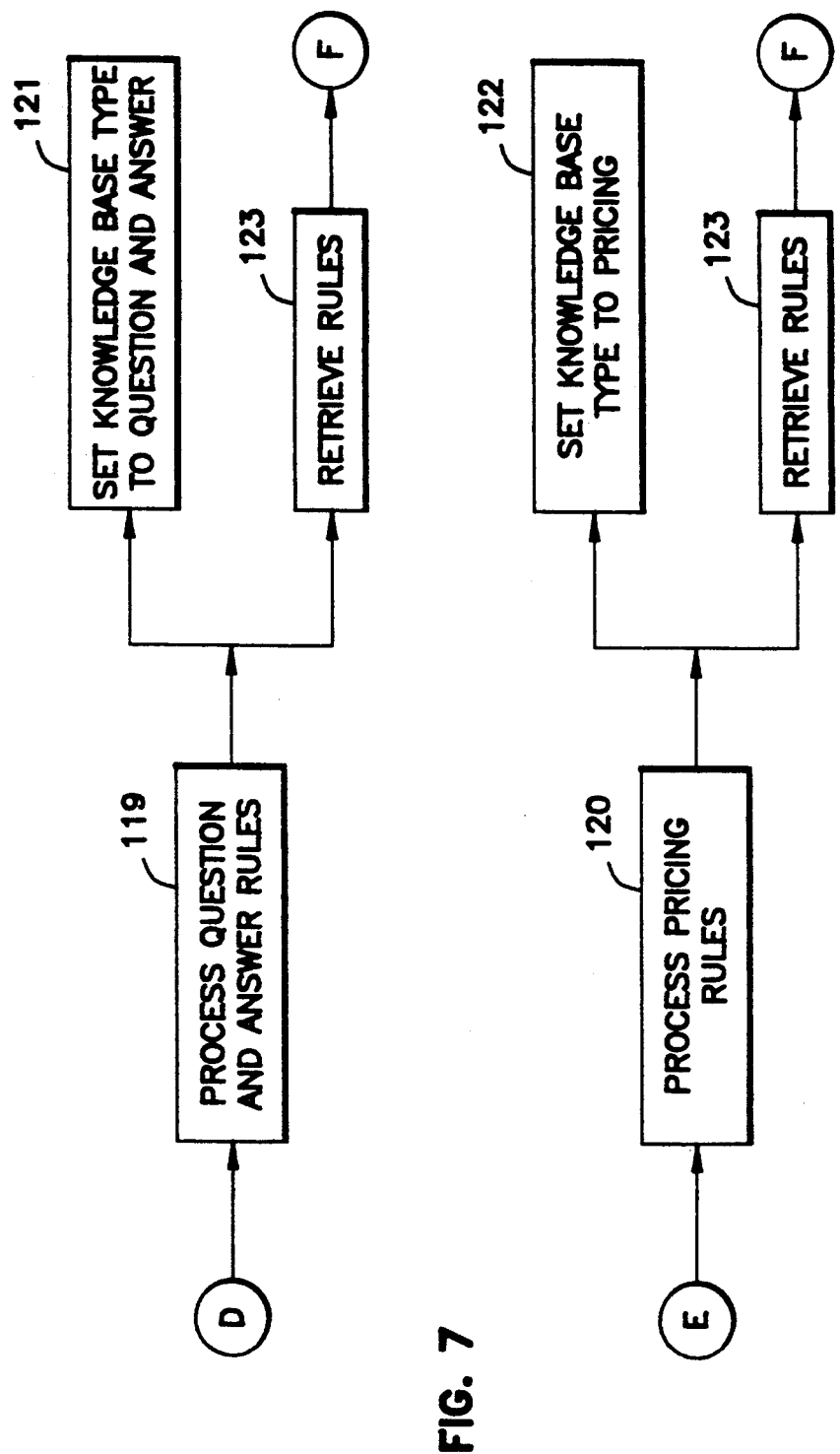
FIG. 7 is a structure chart that shows the preferred flow of data through the processing of question and answer rules, and pricing rules.
Figure 8:
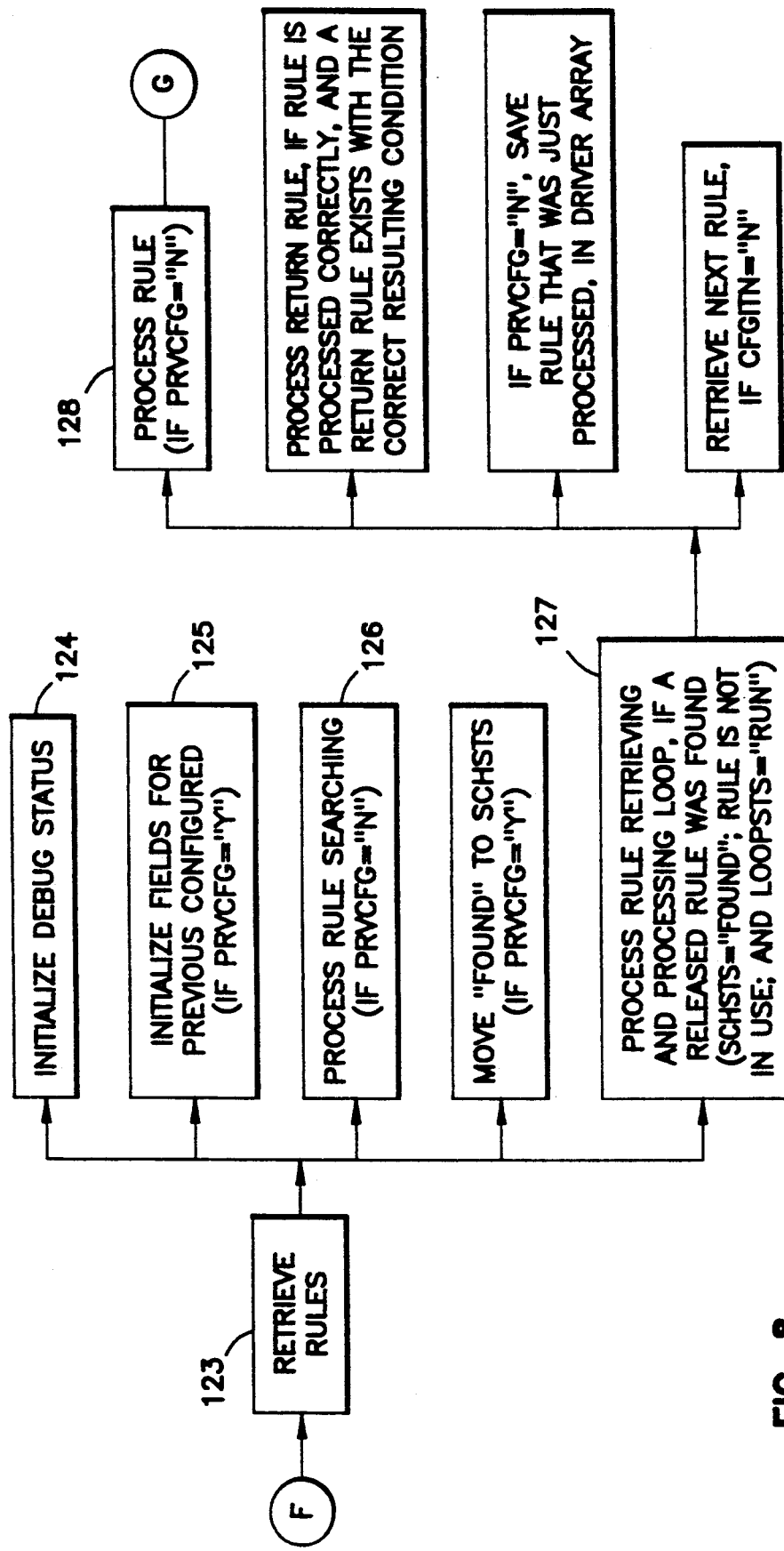
FIG. 8 is a structure chart that shows the preferred flow of data through the process of retrieving rules.

The preferred flow of data in the processing step 113 in the front end configuration is illustrated in the structure charts as shown in FIGS. 6-7. The preferred system first performs initialization functions at steps 116-117. The preferred system processes the front end (order entry and pricing) rules for the configured part at step 118. Processing the configured part involves processing question and answer rules at step 119 in order to obtain option values, and processing pricing rules at step 120 in order to construct price detail records and calculate the final custom price for the end item. The question and answer rules, processed at step 119, may be used to present the user with a choice of options on a user interface and to receive the answer or option value entered by the user.

The preferred flow of data through steps 119 and 120 is illustrated in the structure charts as shown in FIG. 7. The preferred system executes step 119 by setting the knowledge base type to question and answer at step 121 and then retrieving the question and answer rules for processing at step 123. The preferred system executes step 120 by setting the knowledge base type to pricing at step 122 and then retrieving the pricing rules for processing at step 123.

The retrieve rules step begins with initialization steps 124 and 125. Next, the preferred system searches for a fired rule at step 126. At step 127, the preferred system executes a rule retrieving and processing loop if a rule was found. The preferred system processes the found rule at step 128.

Figure 9:
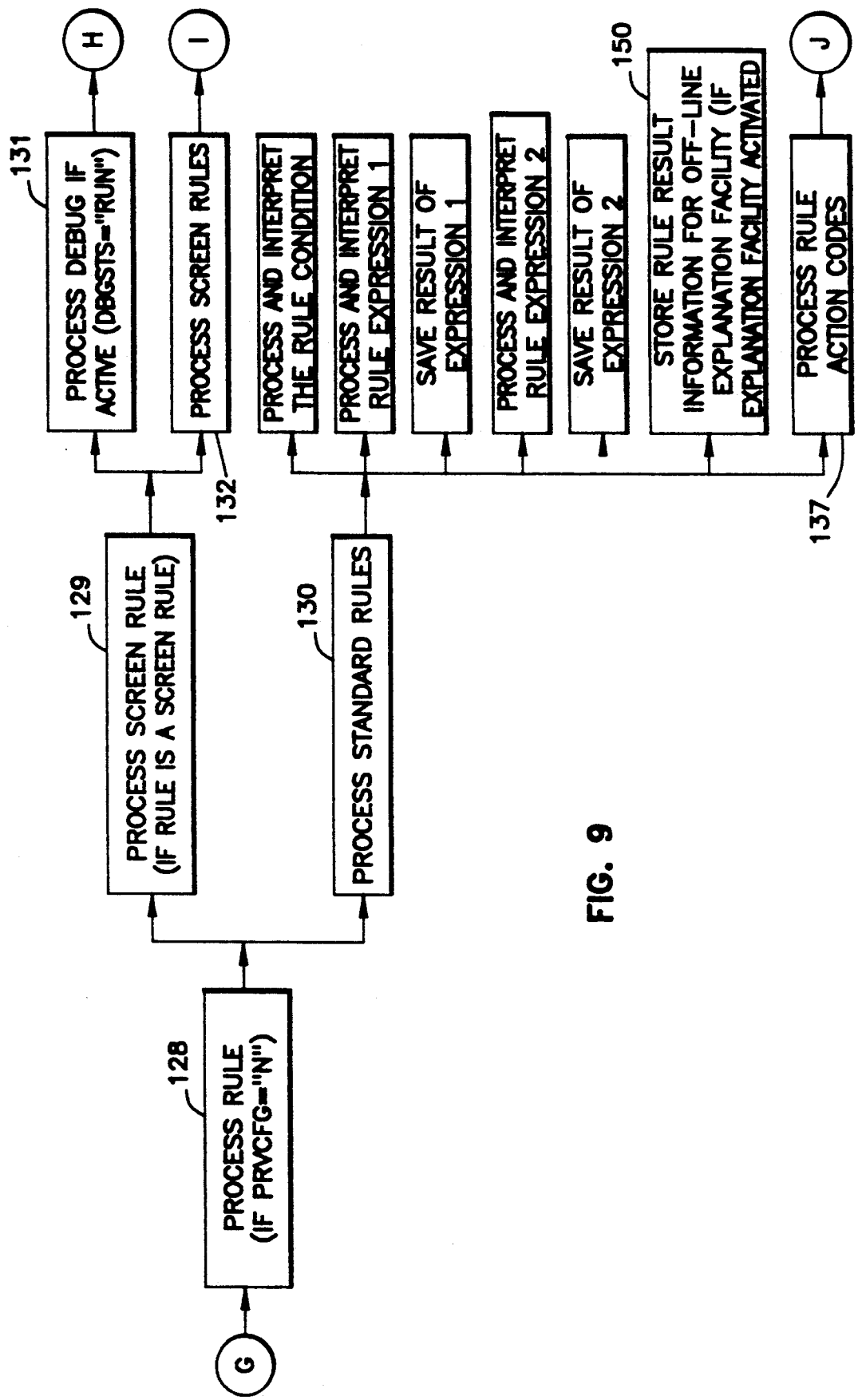
FIG. 9 is a structure chart that shows the preferred flow of data through the processing of rules.
Figure 10:
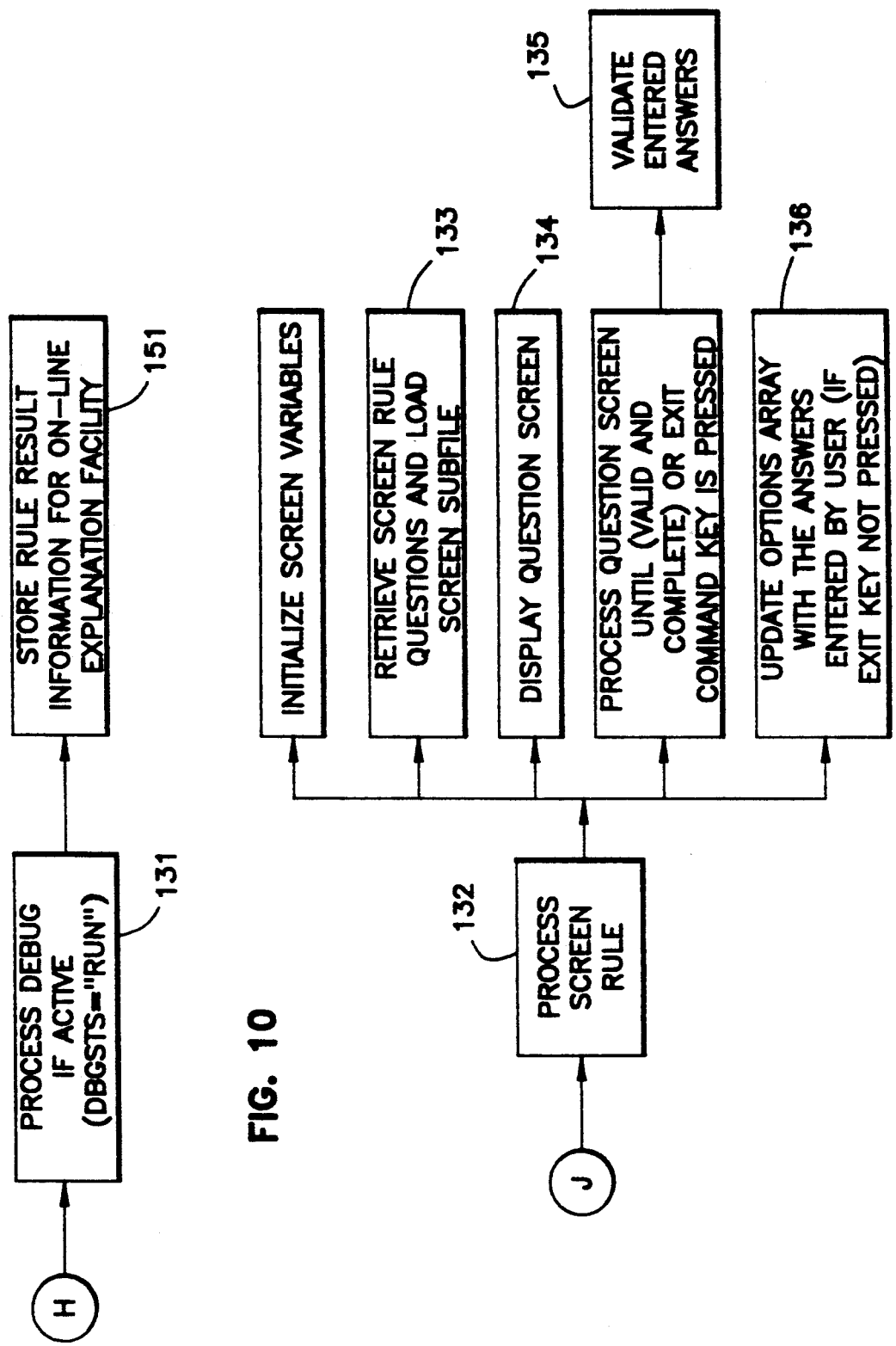
FIG. 10 is a structure chart that shows the preferred flow of data through the processing of the debug (explanation facility) and screen rules.

The preferred flow of data through the rule processing step 128 is illustrated in the structure chart as shown in FIG. 9. Processing step 128 involves processing screen rules at step 129 and processing standard rules at step 130. The preferred system executes step 129 by processing the accumulation of rule information for the explanation facility at step 131 and processing screen rules at step 132. The preferred flow of data through steps 131 and 132 is illustrated in FIG. 10. The screen rules, as shown in FIG. 10, are typically used to present the user with questions regarding choices for option values of a configured item at step 133. At steps 134 and 135, the preferred system validates answers to the questions in order to verify that the answers define valid specifications for the configured item. After validation, the preferred system enters the option values into an array at step 136 for use in future processing in the preferred system.

If the rule fired is not a screen rule, the preferred system processes the standard rules at step 130 (see FIG. 9). Step 130 involves the processing and interpretation of the rule conditions and expressions, after which the preferred system processes the rule action codes at step 137. A rule action code is a specific type of rule, such as those rules defined in Tables 1-14.

Figure 11:
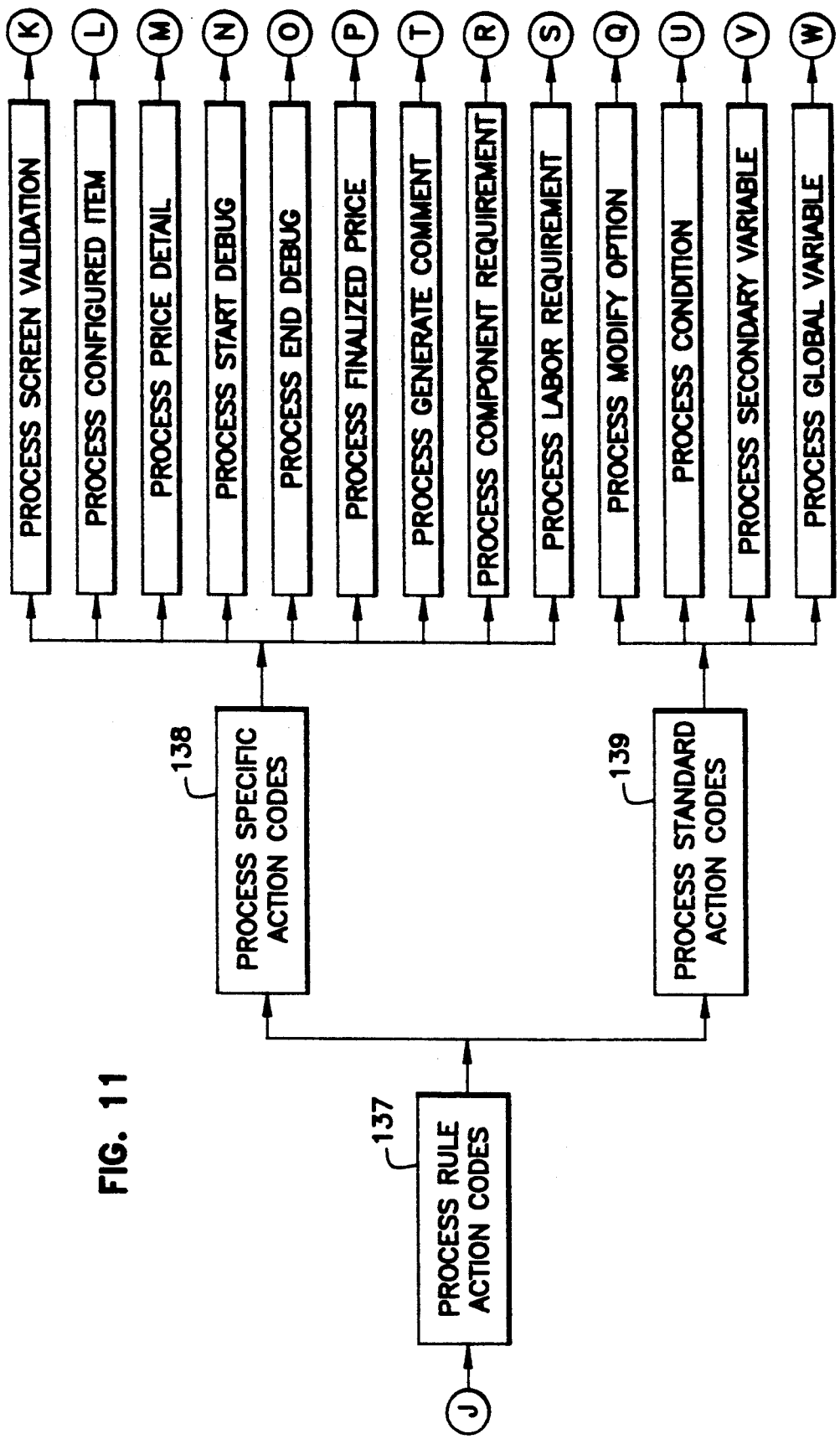
FIG. 11 is a structure chart that shows the preferred flow of data through the processing of rule action codes.
Figure 12:
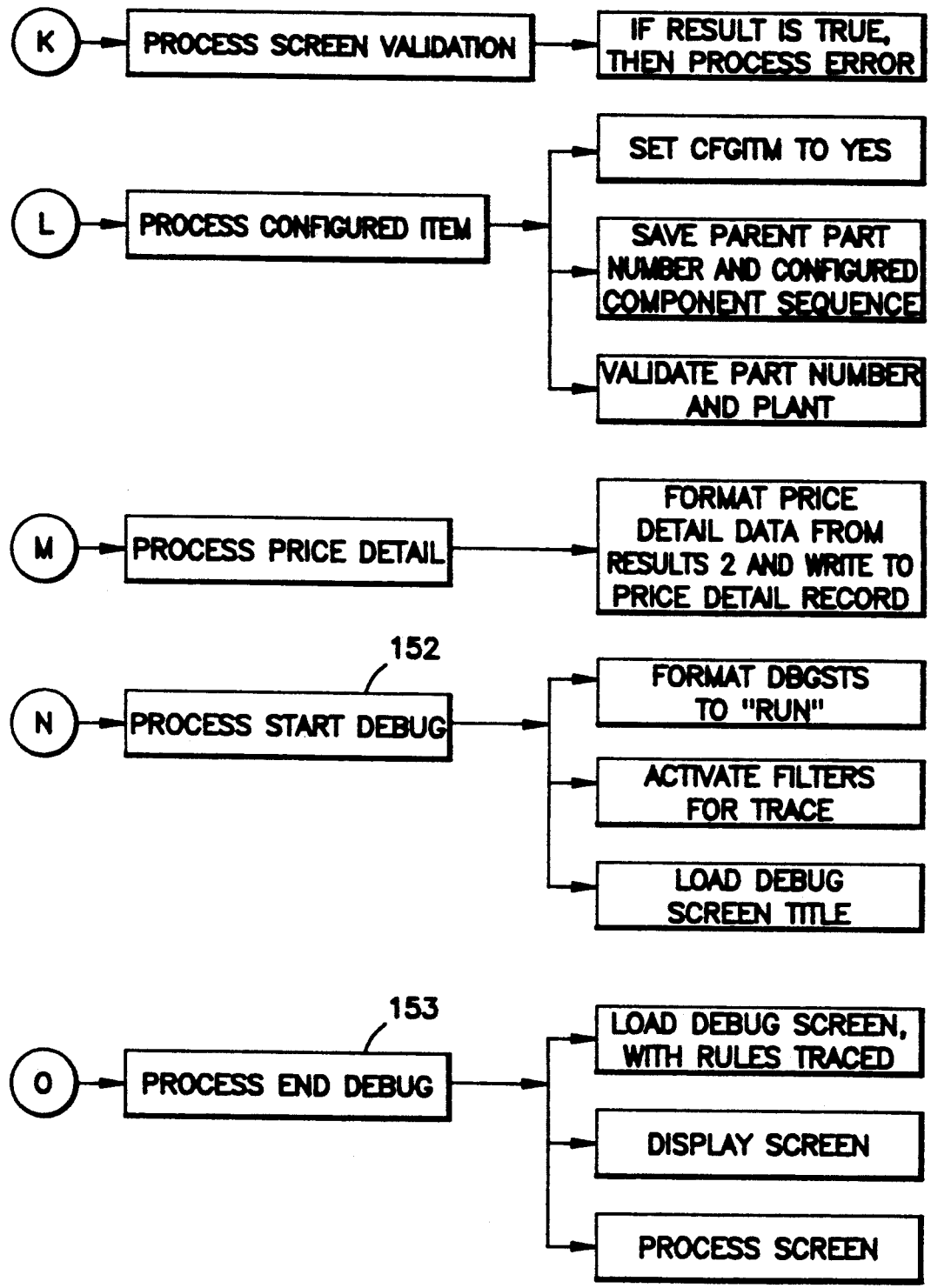
FIG. 12 is a structure chart that shows the preferred flow of data through the processing of a screen validation action code, configured item, price detail rule, start debug rule, and end debug rule.
Figure 13:
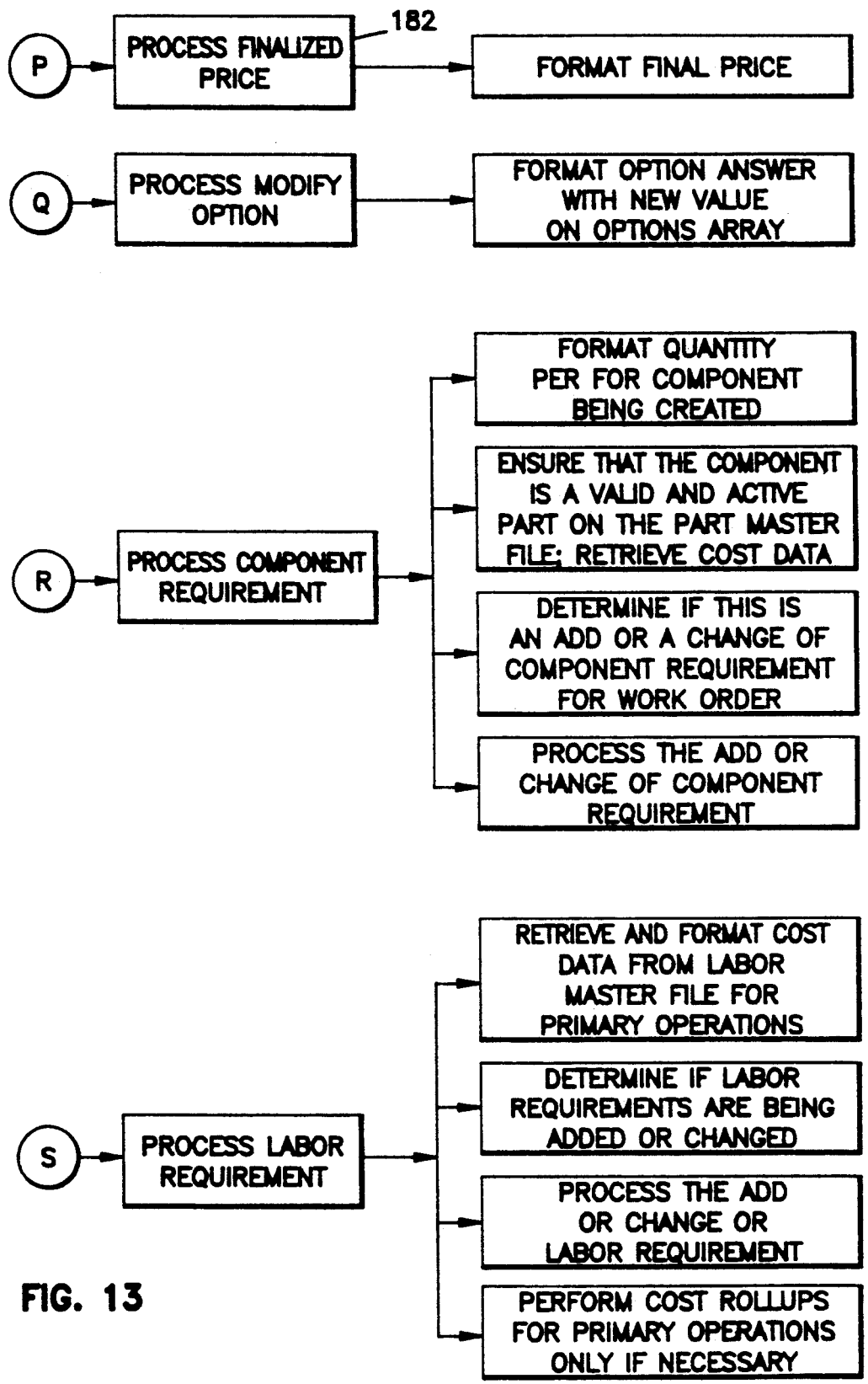
FIG. 13 is a structure chart that shows the preferred flow of data through the processing of the following rules: Finalized Price, Modify Option, Component Requirement, and Labor Requirement.
Figure 14:
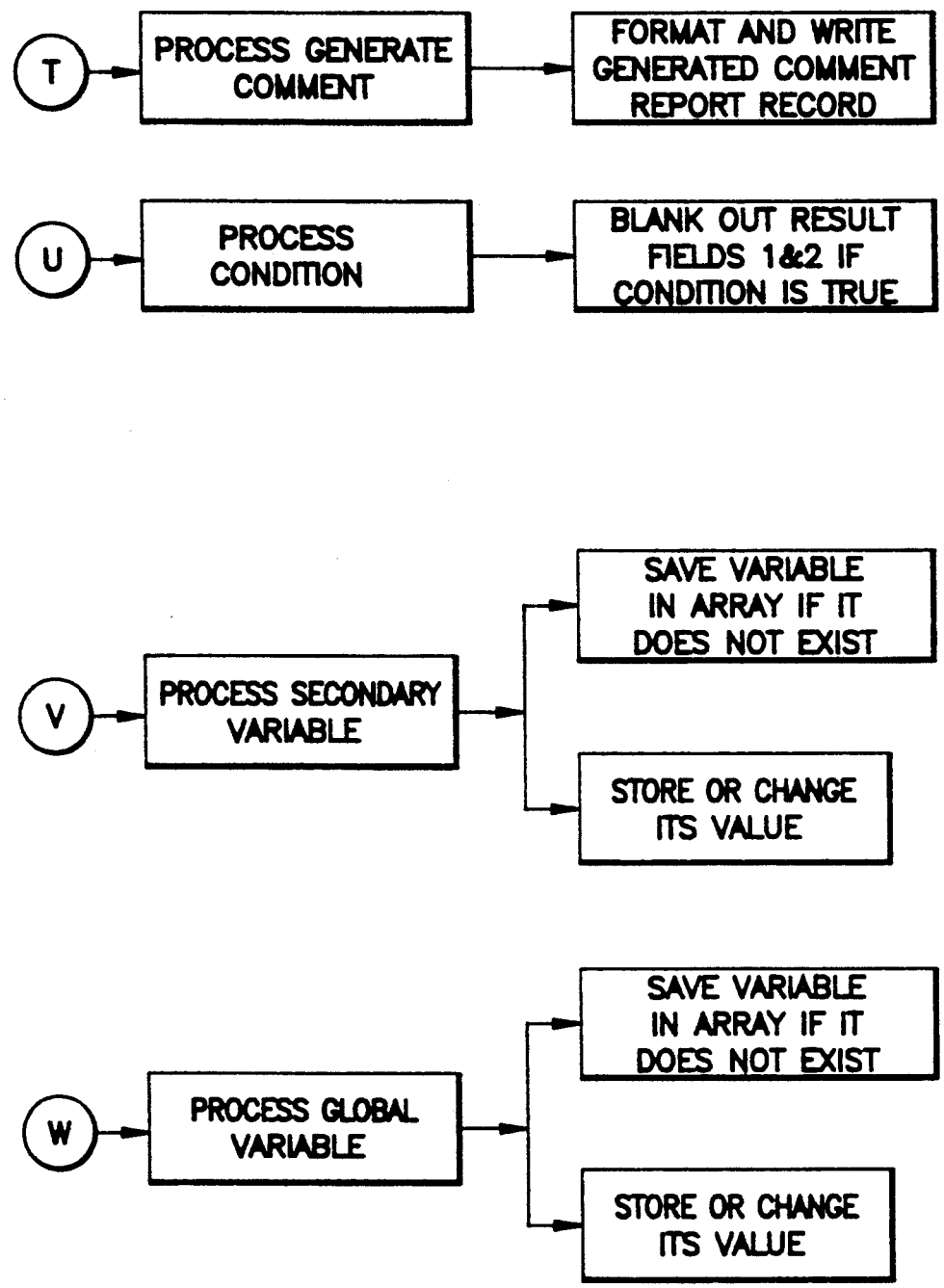
FIG. 14 is a structure chart that shows the preferred flow of data through the processing of the following rules: Generate Comment, Condition, Secondary Variable, and Global Variable.

The preferred flow of data for processing rule action codes at step 137 is illustrated in the structure chart as shown in FIG. 11. The preferred system processes either specific action codes (rule type) at step 138 or standard action codes at step 139 depending on the type of rule fired. The preferred steps for processing the rules indicated by the action codes is illustrated in the structure charts as shown in FIGS. 12-14, and additional information on these rules is provided in Tables 1-14.

Steps 140-142 for processing the component requirement, labor requirement, and generate comment rules are typically only processed for the back end (manufacturing) configuration.

B. Manufacturing Configuration

1. Files

The files used by the manufacturing rules may be defined as shown in Tables 25-27. The front end rules are not limited to these files, and the front end rules may utilize different or additional files to perform functions of the front end configuration. In addition, these files may be used for purposes other than those described.

TABLE 25

MANUFACTURING CONFIGURATION INPUT FILES

| File Name | Description |
| --- | --- |
| Customer Name and Address | Used to format program variables during rules processing. |
| Customer Name and Address | Used to update the customer booked order cost. |
| Date Base Control | Used to check file compatibility. |
| Error Message | Used to retrieve error messages. |
| Shop Calendar | Used in manufacturing work order generation. |
| Shop Calendar by Counter | Used in manufacturing work order generation. |
| Part Master | Used to retrieve configuration data for the part. |
| Product Structure Master File | Used in Manufacturing Order generation. |
| Matrix Header Matrix | Used to retrieve matrix header information for rule processing. |
| Matrix Detail Master | Used to retrieve matrix detail information for rule processing |
| Internal Variables | Used to retrieve variables on the Part Master File or the Sales Order Line File referenced in rules. |
| Sales Order Options Audit Trail | Used to determine whether a Change Configuration Report will be produced during manufacturing configuration. |
| Sales Order Options Selected | Used to determine items ready for configuration. |
| Rules | Used to retrieve rules used for processing. Does not contain inactive or invalid rules. |
| Warehouse Master | Used in Manufacturing work order generation. |
| Workcenter Master | Used in Manufacturing work order generation. |
| Operation Master | Used in Manufacturing work order generation. |

© 1991 ANDERSEN CONSULTING
All Rights Reserved

TABLE 26

MANUFACTURING CONFIGURATION OUTPUT FILES

| File Name | Description |
| --- | --- |
| Errors Detected | Used to generate the Manufacturing Order Errors Detected report. |
| Comments Generated | Used to generation the Manufacturing work order Comments Generated |

TABLE 26-continued
MANUFACTURING CONFIGURATION OUTPUT FILES

| File Name | Description |
|---|---|
| | report. |
| Comments Generated Report Request | Used to request the Comments Generated Report. |
| Change Configuration Report Request | Used to request the Change Configuration Report. |
| MFG Errors Detected Report Request | Used to request the Manufacturing Errors Detected Report. |

© 1991 ANDERSEN CONSULTING
All Rights Reserved

TABLE 27
MANUFACTURING CONFIGURATION UPDATE FILES

| File Name | Description |
|---|---|
| Generated Labor Requirements | Used to store labor requirements generated by the Expert Configurator. |
| MFG Configuration Transaction | Used to trigger asynchronous processing of manufacturing configuration for a sales order. |
| Sales Order Options | Used to process a sales order line item according to the features and options selected |
| Manufacturing Trace | Used to generated the manufacturing work order Trace report. |
| MFG Trace Report Request | Used to request the Manufacturing Trace Report. |
| Manufacturing Work Order Header Transaction | Used to pass manufacturing work order header data to a system monitor. |
| Manufacturing Work Order Component Requirements | Used to pass manufacturing work order component requirement data to a system monitor. |
| Manufacturing Work Order Header | Used in manufacturing work order generation. |
| Sales Order Header | Used to retrieve sales order header information. |
| Sales Order Line Item | Used during rules processing. |
| Reference | Used to retrieve the date format, file status codes, group and subgroup information. |

© 1991 ANDERSEN CONSULTING
All Rights Reserved

2. Processing Structure

Figure 15:
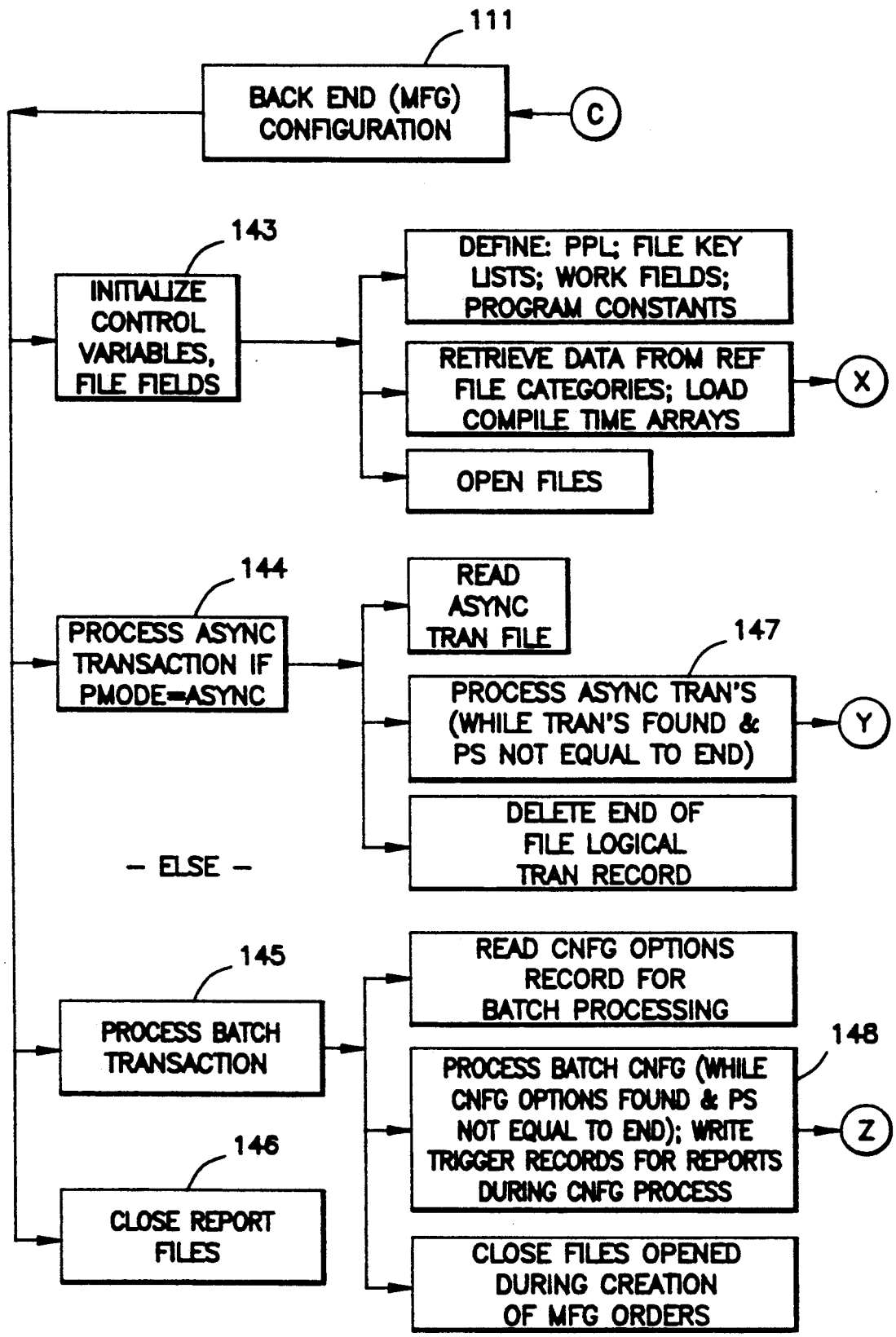
FIG. 15 is a structure chart that shows the preferred flow of data through the back end (manufacturing) configuration in the inference engine defined by the present invention.

The preferred system implements the back end (manufacturing) configuration 111 as illustrated in the structure diagrams as shown in FIGS. 15-23. Referring to FIG. 15, the back end configuration 111 first performs initialization step 143. The back end configuration 111 next processes either an asynchronous transaction at step 144 or a batch transaction at step 145, depending upon the current mode of the system. Asynchronous mode may be used to generate custom work orders for the end item and all configured components within an end item during the same processing session, one end item processed at a time after the user completes front end configuration. Batch mode may be used to process all option values for the end item and all configured components within an end item during the same processing session, one end item processed at a time until all eligible option records are processed. After processing, the preferred system closes report files at step 146 to end the back end configuration process.

Figure 16:
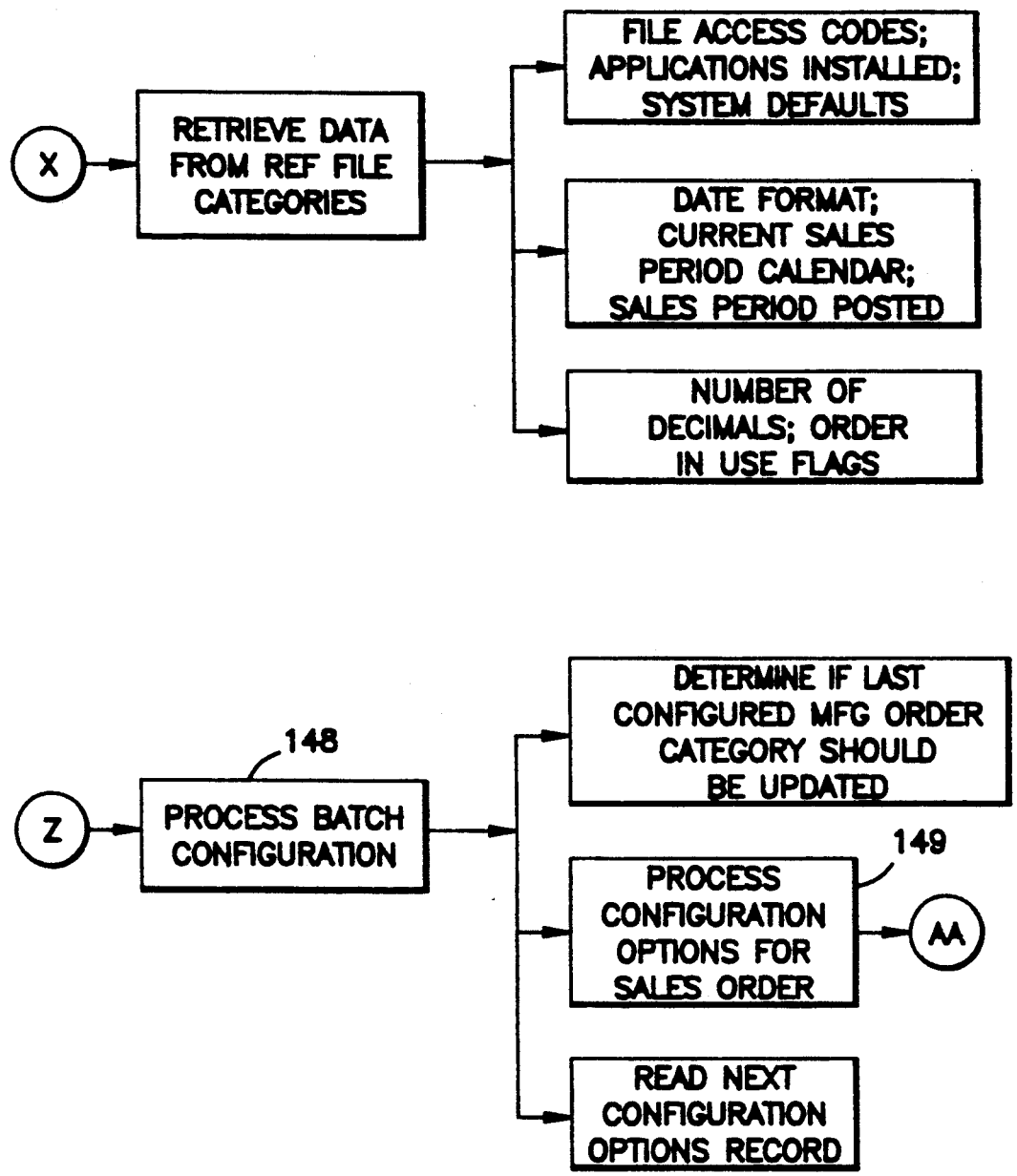
FIG. 16 is a structure chart that shows the preferred flow of data through the process of batch configuration and retrieving data from reference file categories.
Figure 17:
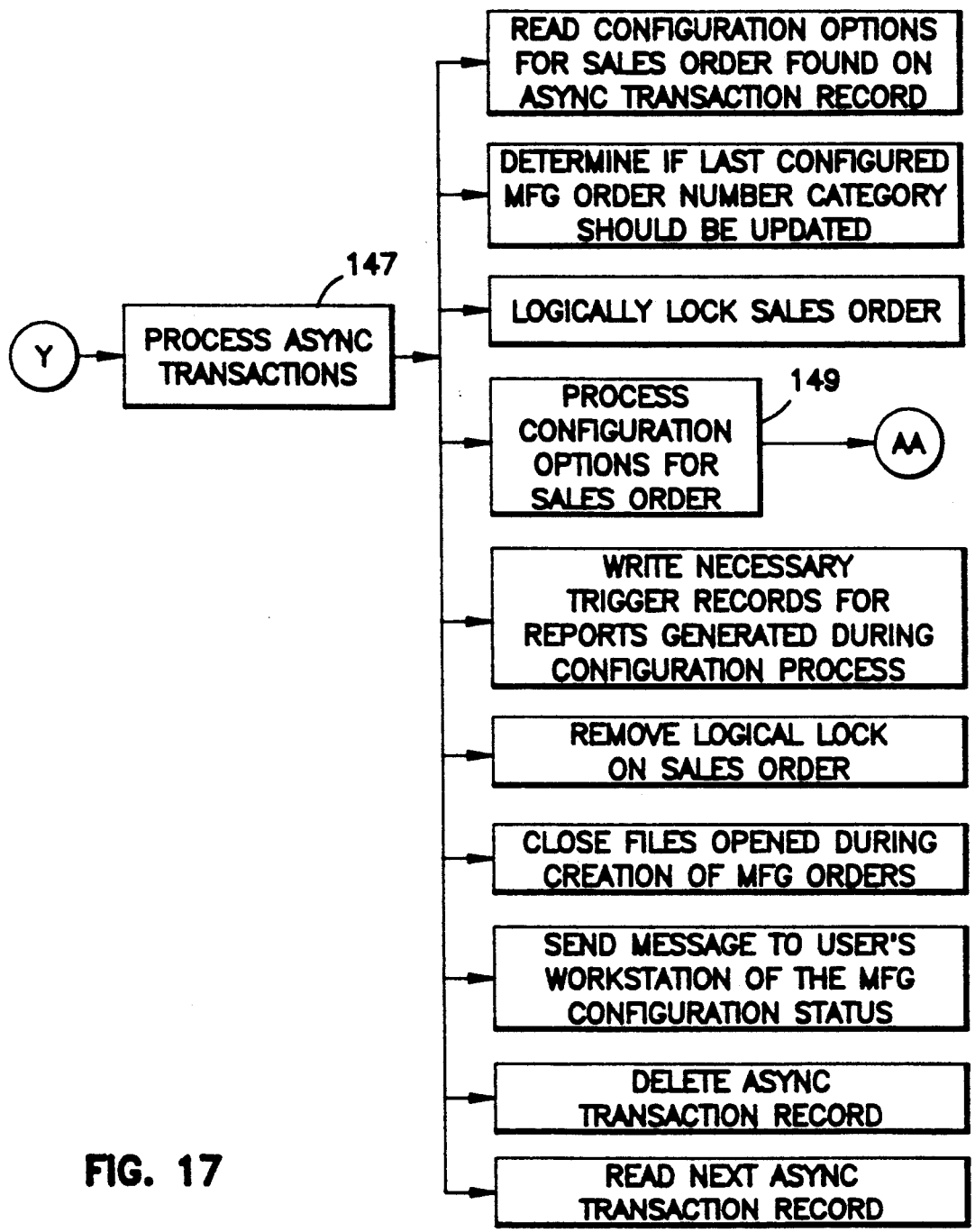
FIG. 17 is a structure chart that shows the preferred flow of data through the processing of asynchronous transactions.
Figure 18:
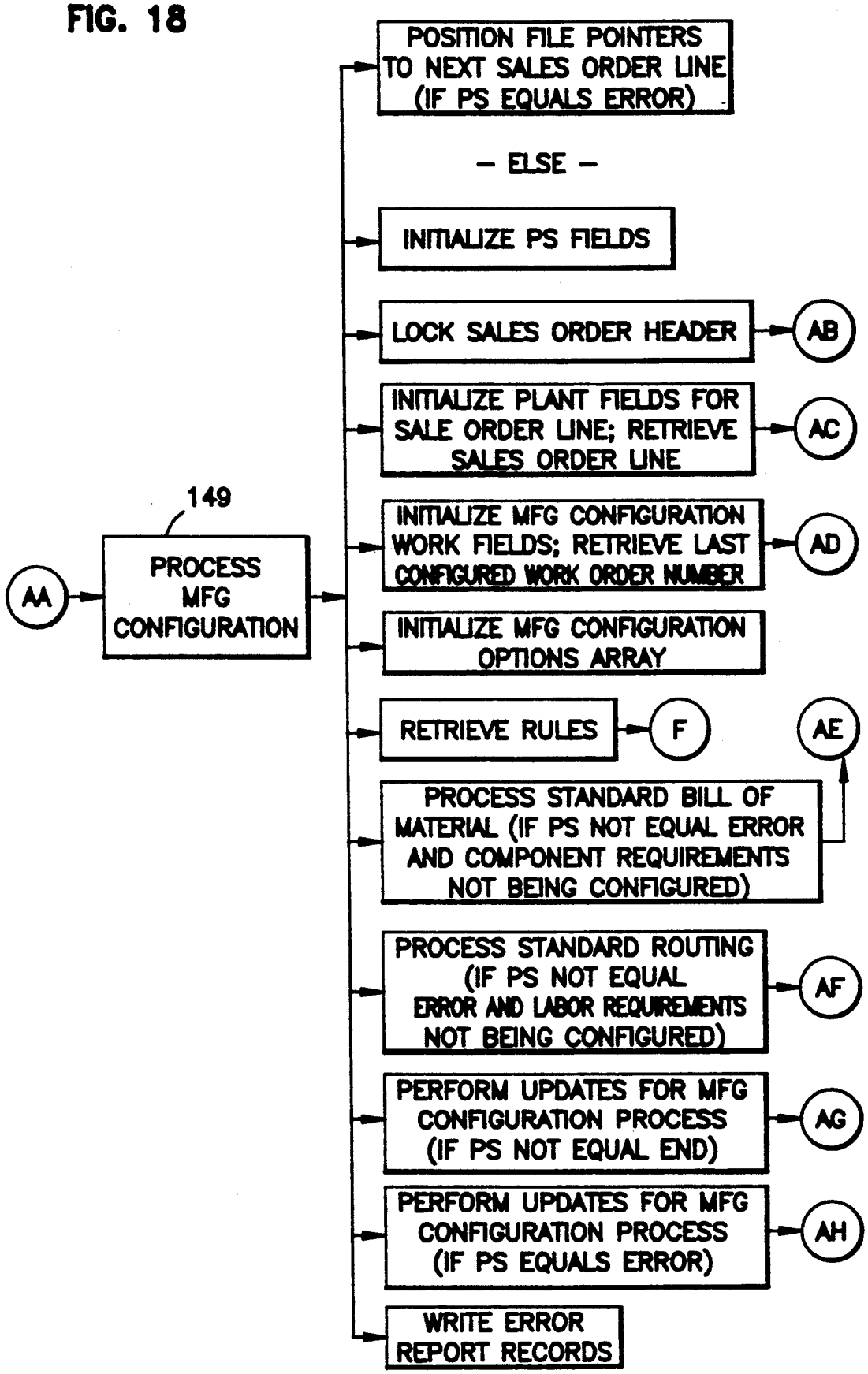
FIG. 18 is a structure chart that shows the preferred flow of data through the processing of a manufacturing configuration.
Figure 20:
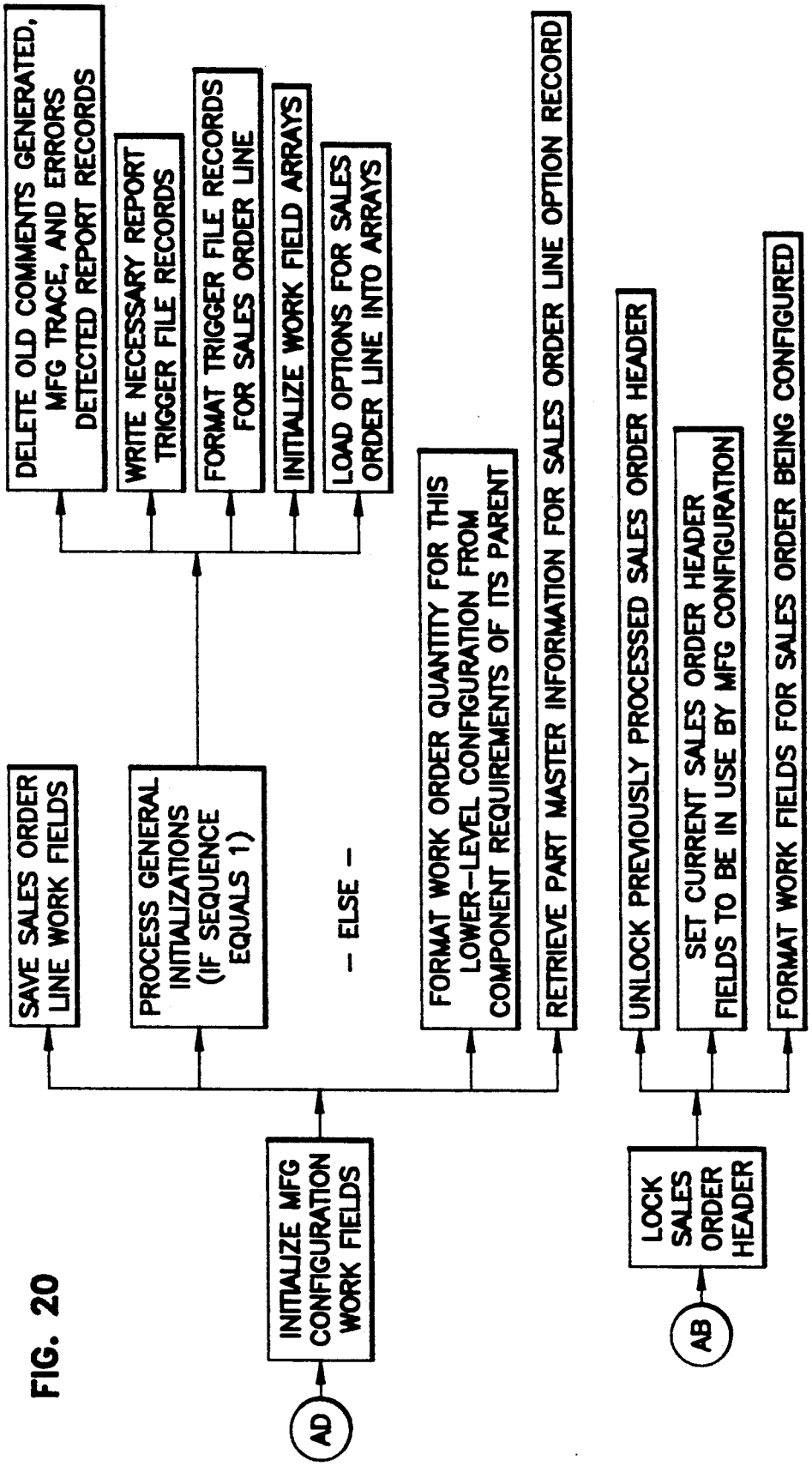
FIG. 20 is a structure chart that shows the preferred flow of data through the process of initializing manufacturing configuration work fields and locking the sales order header.
Figure 21:
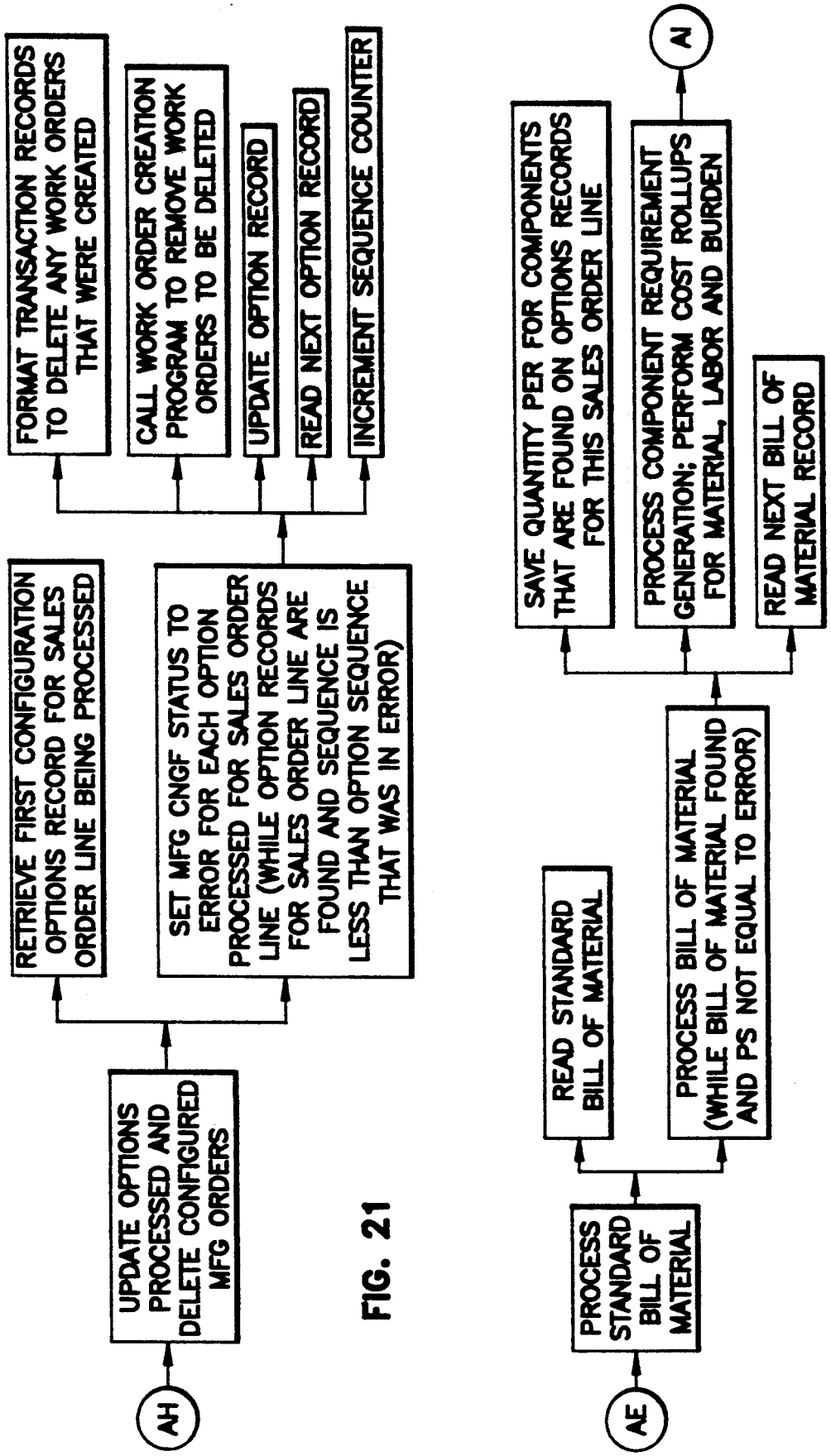
FIG. 21 is a structure chart that shows the preferred flow of data through the processing of a standard bill of material, updating options processed, and deleting configured manufacturing orders.
Figure 22:
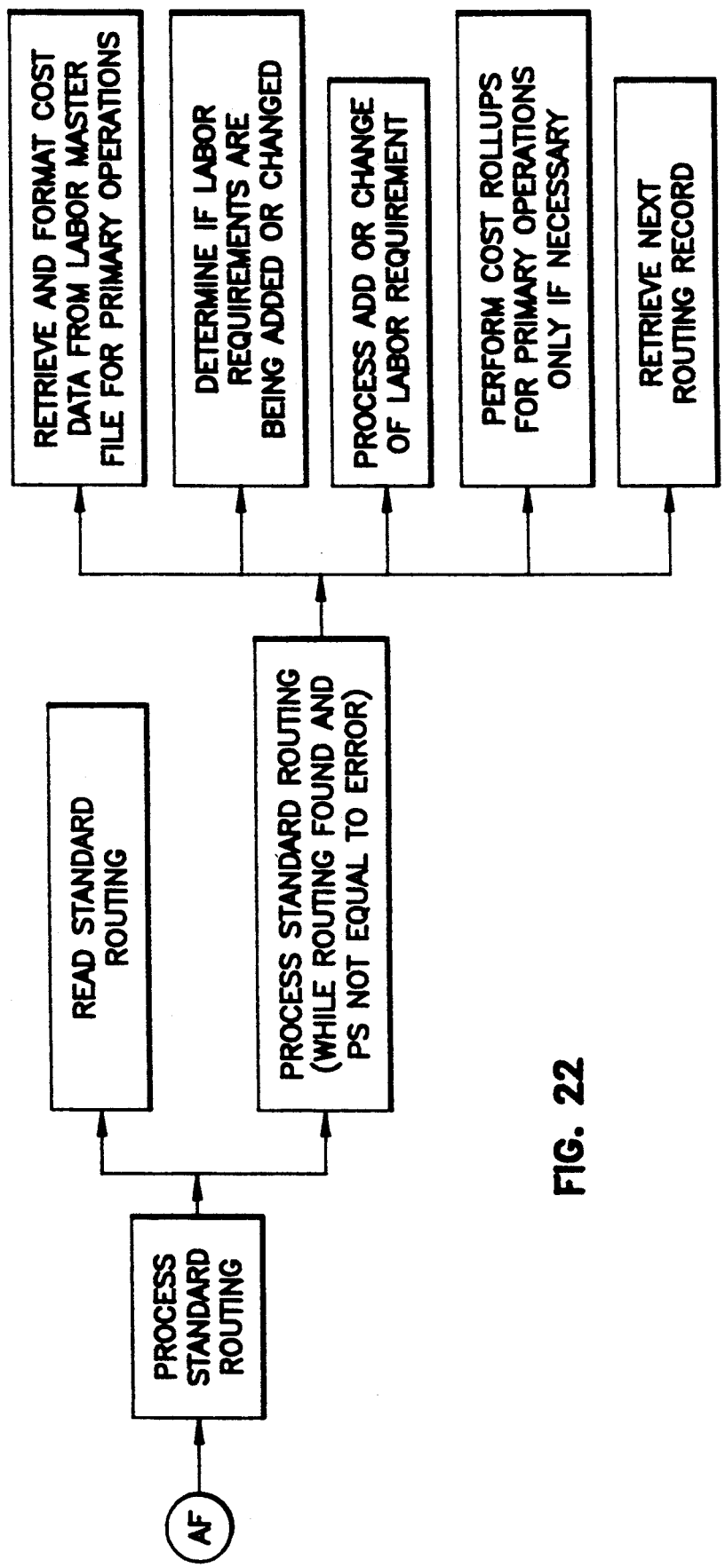
FIG. 22 is a structure chart that shows the preferred flow of data through the processing of standard routing.
Figure 23:
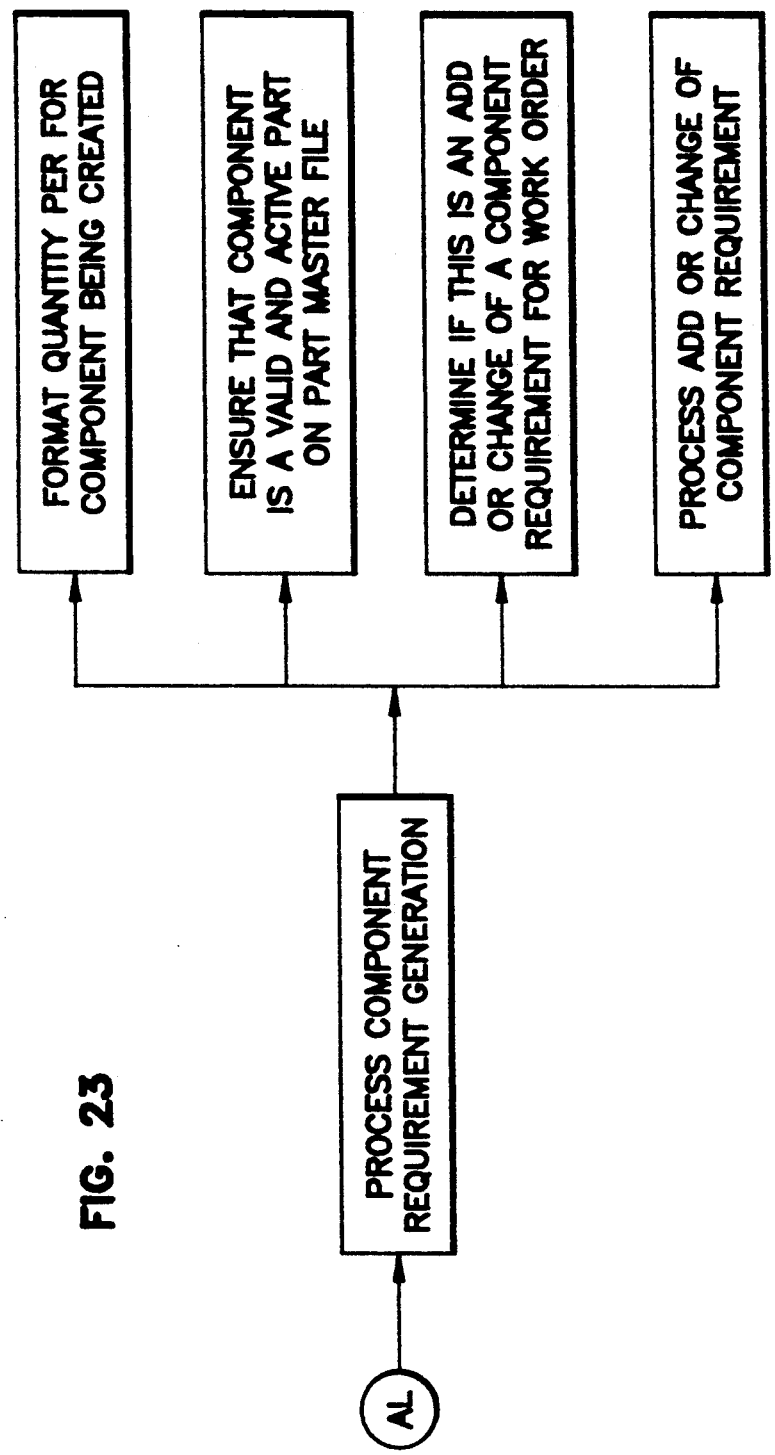
FIG. 23 is a structure chart that shows the preferred flow of data through the processing of component requirement generation.

The preferred flow of data through the asynchronous transaction step 147 is illustrated in the structure chart as shown in FIG. 17. The batch configuration processing step 148 is illustrated in the structure chart as shown in FIG. 16. Both the asynchronous and batch transaction processing steps 147 and 148 perform the primary processing of option values in step 149 for the generation of custom work orders for configured components.

The generation of the custom work orders in step 149 is preferably implemented by the structure as shown in FIGS. 18-23. Generating the custom work orders includes, among other things, dynamically generating component and labor requirements for the configured items. The preferred system may also specify which plant or actual manufacturing site will be utilized to process each of the custom work orders.

V. KNOWLEDGE ACQUISITION FACILITY

The knowledge acquisition facility 104 in the preferred system allows the user to define rules by entering information into the rule base. FIGS. 27 and 28 represent preferred user interfaces for entering header and detail information respectively for screen generation rules. FIGS. 29 and 30 represent preferred user interfaces for entering header and detail information respectively for standard rules. The preferred flow of data through the knowledge acquisition facility 104 is illustrated in the structure charts as shown in FIGS. 24 and 25.

Figure 24:
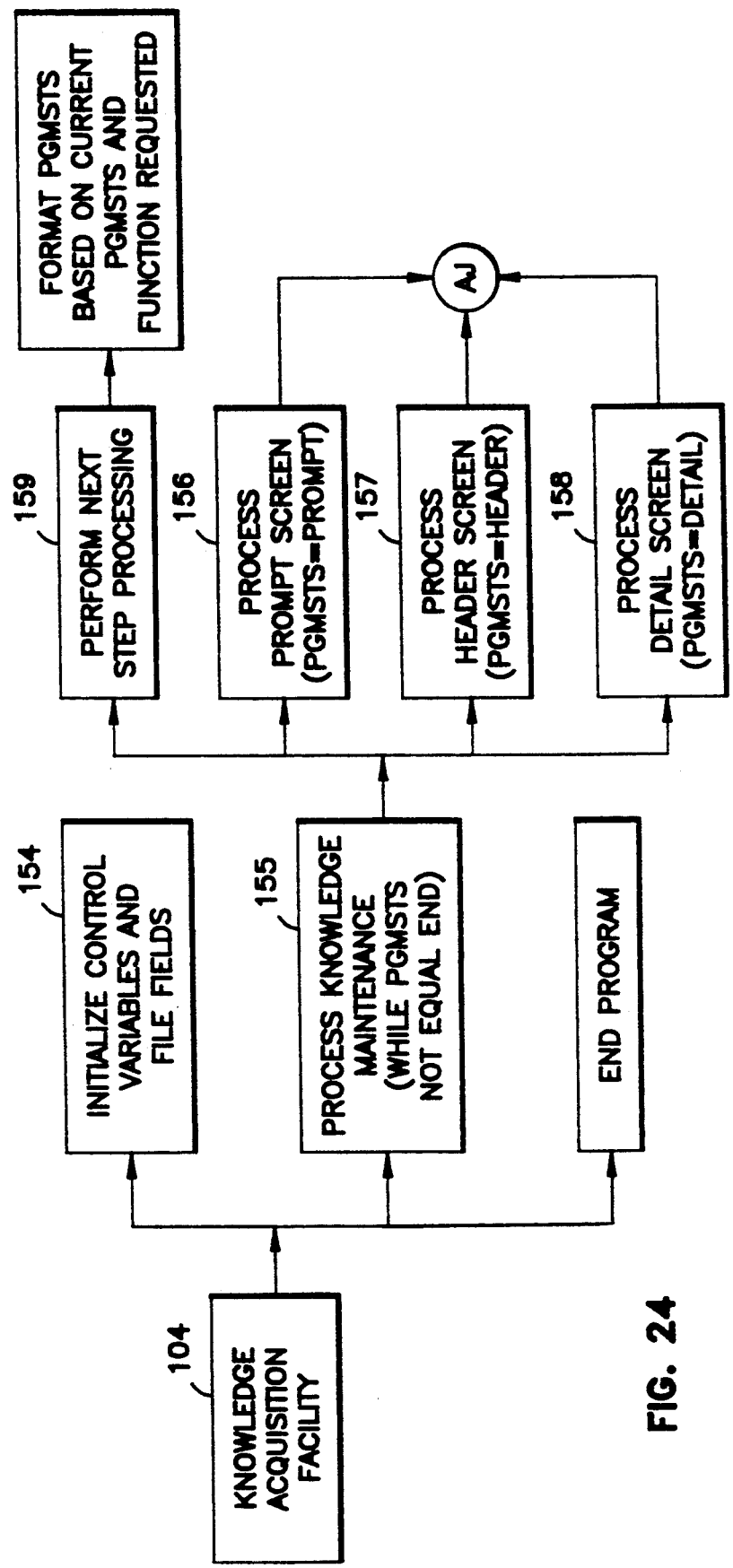
FIG. 24 is a structure chart that shows the preferred flow of data through the Knowledge Acquisition Facility Module.
Figure 25:
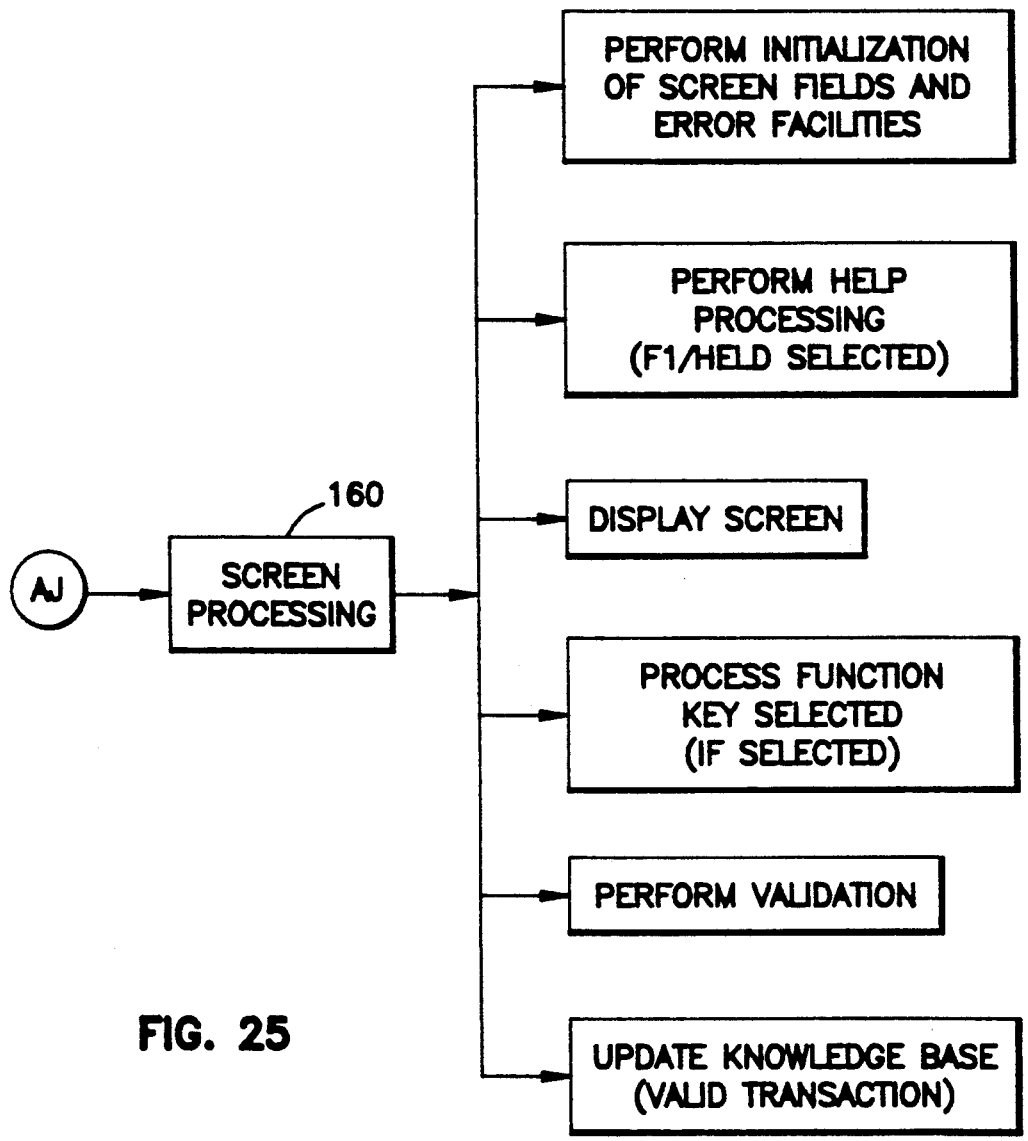
FIG. 25 is a structure chart that shows the preferred flow of data through the screen processing function.

FIG. 24 shows the basic process of the knowledge acquisition, which begins with an initialization step 154. The preferred system next processes information entered by the user at step 155. The preferred system processes the next step 159 by first formatting the program status. Then the preferred system processes information from the prompt, header, and detail screens at steps 156-158. The header and detail screens contain the user-entered information for the header and detail portions of a particular rule. Steps 156-158 each use a screen processing step 160 as shown in FIG. 25 as part of the knowledge acquisition process.

VI. MATRIX MAINTENANCE

Figure 26:
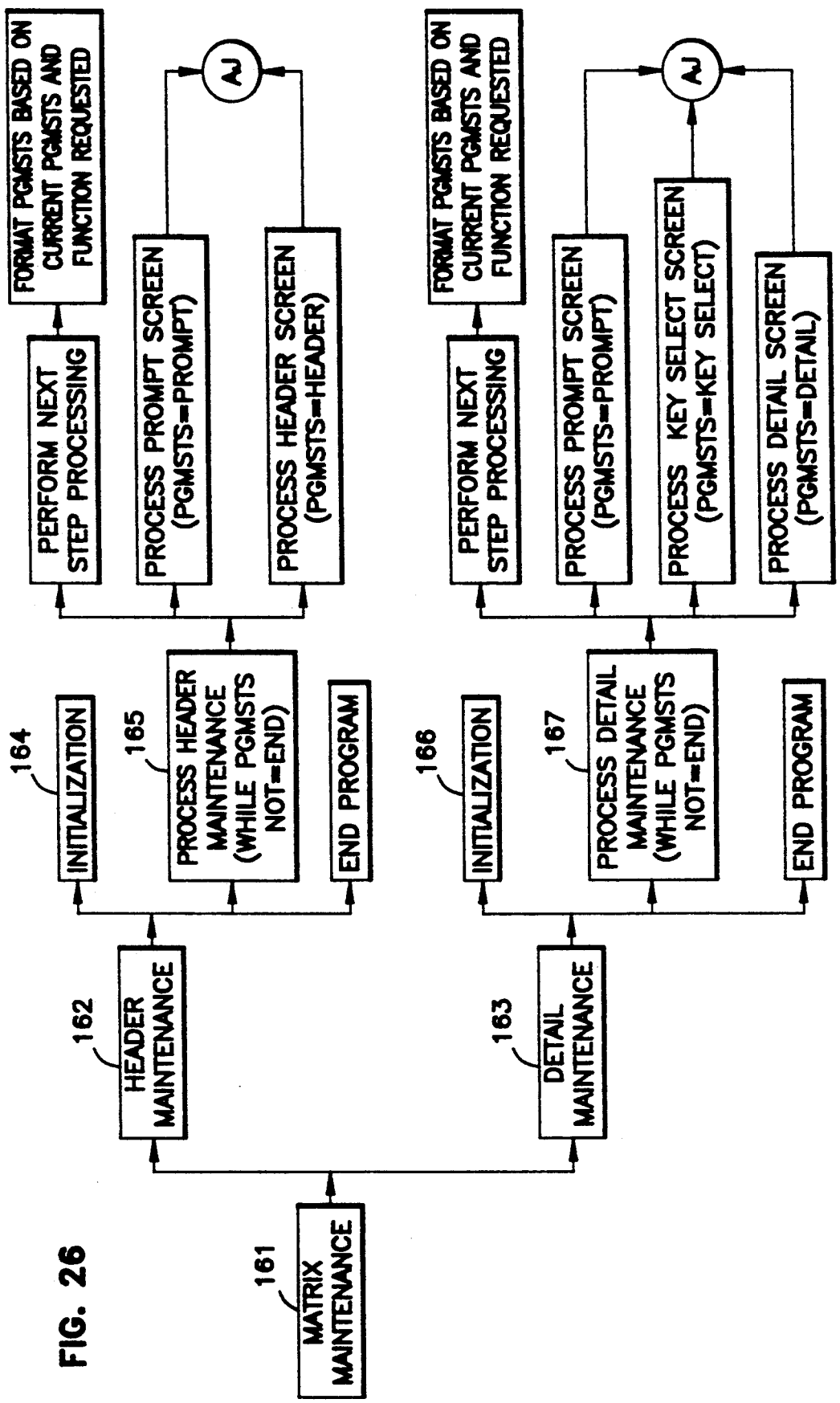
FIG. 26 is a structure chart that shows the preferred flow of data through the matrix maintenance function.

The knowledge acquisition facility 104 in the preferred system also comprises a matrix maintenance function 161, the structure of which is shown in FIG. 26. Matrix maintenance 161 allows the user to define matrices for use with rules in the preferred system by entering identifying information (header) of a particular matrix along with the actual data of the matrix (detail) FIGS. 36 and 37 represent preferred user interfaces for entering header and detail information respectively for matrices.

As shown in FIG. 26, the processing steps of the matrix maintenance 161 use a similar reasoning as the knowledge acquisition facility. The processing is divided into a header maintenance step 162 and a detail maintenance step 163 for entering information into the knowledge base that defines the header and detail of a particular matrix. Both the header and detail maintenance steps begin by initializing control variables and files fields, steps 164 and 166. After initialization, the preferred system processes the header and detail maintenance at steps 165 and 167, and this processing follows the same logic as the knowledge acquisition facility and makes use of the screen processing function shown in FIG. 25.

VII. EXPLANATION FACILITY

The explanation facility 106, which may be activated or deactivated, allows the preferred system to trace rule firing and execution process. The explanation facility is implemented in the structure charts at steps 124, 131, and 150–153. When activated, it provides the user with a list of the rules and the results of those rules in the firing sequence in which the rules were executed. Each rule in the list may be displayed with the results of that rule and the firing information (i.e. the previously fired rules that released the rule). The processed rules may also be displayed with a user-defined text that describes the rule's purpose.

FIG. 31 represents a preferred user interface for displaying a trace of rules executed by the system. FIG. 32 represents a preferred user interface for displaying a trace of rules when the FOLD/TRUNCATE feature has been selected. FIG. 33 represents a preferred display for reporting a trace of rules.

This list, or trace of rules, represents the forward chaining process and allows the user to have a visual representation of the preferred system's reasoning process, which is a valuable diagnostic tool. The uses and benefits of this type of diagnostic tool include: documenting support for conclusions, checking the logic of questionable results, showing the basis of a conclusion, and testing the correctness or completeness of a process.

In front end configuration, the user may use filters in the preferred system to limit the trace to selected rules, such as validation rules. The user may also use begin and end points, with or without filters, during the rule trace process to display only a portion of an execution path.

VIII. INVENTORY MANAGEMENT OF CONFIGURED PARTS

In a typical manufacturing environment, inventory may be identified by a system at the part level, within a stock location, and within a warehouse location. For example, the system can track and identify part 170 as being located in stock location bin number 001 within warehouse A. In other environments, the system can also track and identify inventory by lot number, as in a pharmaceutical company. For example, the system can track and identify part 170 as being a member of lot Y, located in stock location bin number 001 within warehouse A.

The presence of configured items in a manufacturing system poses a need to identify inventory at a level sufficient to segregate inventory by the specific characteristics of the configuration. Utilizing this level of identification, the preferred system may distinguish between parts of the same part number within the standard stock location identification method described above. For example, the system can track and identify part 170, being red with a stereo having a compact disk player, as being located in stock location bin number 001 within warehouse A and being different from part 170 (the same part number), being blue without a stereo and being located in stock location bin number 001 within warehouse A.

The preferred system provides a mechanism for creating a configuration code which the system may use to identify options or combinations of options selected for an item. This configuration code may then be tied to a lot number in order to take advantage of the low level inventory identification method that lot number processing currently offers. As configured parts are created and received into inventory, the configured parts will be received into a lot that utilizes a cross-referencing technique to identify the lot with a configuration code. The system may thus identify and track parts in inventory by configuration code.

A. Creating a Configuration Code

The creation of the configuration code is based on data available to the system, including, but not limited to, option values. One way that this may be accomplished is to associate a configuration code template to a part, the template defining the meaning of characteristics within the configuration code. The template format may be defined by a user. For example, a template associated to a speed boat may be described as shown in Table 28.

TABLE 28

| SPEED BOAT TEMPLATE | |
|---|---|
| Position | Description |
| 1–3 | Model |
| 4–5 | Exterior color |
| 6–7 | Interior color |
| 8–9 | Size in feet |

© 1991 ANDERSEN CONSULTING
All Rights Reserved

A red and white 16 foot luxury speed boat may be identified by the configuration code SPXRDWT16; where SPX represents a Speed Boat-Luxury Mode; RD represents a red exterior color; WT represents a white interior color; and 16 represents a 16 foot boat.

B. Cross-Referencing

In an alternative embodiments, the system may also identify inventory at the configuration code level. For example, the system may use the configuration code as a key to the inventory file(s) used to identify inventory to the system. The system may also utilize a lot number to configuration doe cross-referencing technique. Since the system may identify inventory at the lot level, if the system maintains a relationship that links a lot number to a configuration code, the system then has a means to identify and track inventory at the configuration code level by taking advantage of lot level inventory identification.

While the present invention has been described in connection with the preferred embodiment thereof, it will be understood that many modifications will be readily apparent to those skilled in the art, and this application is intended to cover any adaptations or variations thereof. For example, while the present invention has been shown as a knowledge based implementation, other types of systems for implementing the present invention are possible without departing from the scope of the invention.

It is manifestly intended that this invention be limited only by the claims and equivalents thereof.

What is claimed is:

1. A multi-level system for constructing a first custom work order for an end item and a plurality of second custom work orders for a plurality of configurable lower-level items necessary for manufacturing the end item, the system comprising:

a) order entry configuration means for enabling a customer desiring a particular product to specify features and options corresponding to the product, the product comprising the end item and the configurable lower-level items, the order entry configuration means comprising:
   i) questioning means for presenting a plurality of sets of questions to a user, the sets of questions relating to the features and options of the product; and
   ii) input means for inputting a plurality of sets of answers to the questions, the sets of answers specifying the features and options for the end item and the configurable lower-level items;
b) options storage means for storing the plurality of sets of answers, the options storage means comprising:
   i) end item data structure means for storing the features and options needed to generate work order requirements to construct the end item; and
   ii) lower-level item data structure means for storing the features and options needed to generate work order requirements to construct the configurable lower-level items; and
c) manufacturing configuration means for automatically generating the first custom work order to construct the end item and the plurality of second custom work orders to construct the configurable lower-level items, the manufacturing configuration means comprising:
   i) means for accessing the end item data structure means and the lower-level item data structure means in order to retrieve the sets of answers; and
   ii) means for translating the retrieved sets of answers into manufacturing requirements and for generating from the manufacturing requirements the first custom work order and the plurality of second custom work orders for construction of the product, including the end item and the configurable lower-level items, meeting the features and options specified by the customer, the first custom work order corresponding to construction of the end item and the plurality of second custom work orders corresponding to construction of the configurable lower-level items.

2. The system of claim 1 wherein:
a) the order entry configuration means comprises order entry rules for defining actions, and e conditions upon which the actions are dependent, to be executed by the order entry configuration means during a process of obtaining the sets of answers; and
b) the manufacturing configuration means comprises manufacturing rules for defining actions, and conditions upon which the actions are dependent, to be executed by the manufacturing configuration means during a process of generating the custom work orders.

3. The system of claim 2 wherein the order entry configuration means and the manufacturing configuration means further comprise forward chaining means for processing the order entry rules until the answers are complete and for processing the manufacturing rules until the custom work orders are complete, the forward chaining means comprising:
a) firing means for releasing the order entry rules and the manufacturing rules for execution;
b) compare means for comparing the condition of each of the order entry rules and the manufacturing rules with data available to the system; and
c) execution means for executing the action of each of the order entry rules and the manufacturing rules only if the condition of the corresponding rule is satisfied and the rule has been released by the firing means.

4. The system of claim 1, further comprising pricing configuration means for generating a custom price for the end item based upon the sets of answers.

5. The system of claim 4 wherein the pricing configuration means comprises pricing rules for defining actions, and conditions upon which the actions are dependent, to be executed by the pricing configuration means during a process of generating the custom price.

6. The system of claim 5 wherein the pricing configuration means further comprises forward chaining means for processing the pricing rules until the custom price is generated, the forward chaining means comprising:
a) firing means for releasing the pricing rules for execution;
b) compare means for comparing the condition of each of the pricing rules with data available to the system; and
c) execution means for executing the action of each of the pricing rules only if the condition of the corresponding rule is satisfied and the rule has been released by the firing means.

7. The system of claim 3 wherein the input means comprises user-defined input means for inputting a plurality of sets of user-defined answers to the questions.

8. The system of claim 3 wherein the input means comprises rule-determined input means for inputting a plurality of sets of rule-determined answers to the questions.

9. The system of claim 3 wherein the order entry configuration means further comprises screen generation means for generating a graphical interface for presenting a user with the sets of questions and for allowing the user to enter the sets of answers.

10. The system of claim 3 wherein the order entry configuration means further comprises validation means for determining whether the sets of answers produce valid combinations for the end item.

11. The system of claim 3 wherein the order entry configuration means further comprises configured component rule means for identifying custom lower-level items required to construct the end item and for establishing links between the sets of answers so that the linked sets of answers comprise complete specifications for the end item.

12. The system of claim 3 wherein the manufacturing configuration means further comprises:
a) component requirement means for determining the components required for the custom work orders; and
b) labor requirement means for determining the labor required for the custom work orders.

13. The system of claim 11 wherein the lower level item data structure means comprises means for storing the parameters of each of the lower level items as unique data sets so that each parameter is stored in only one of the data sets.

14. The system of claim 3 wherein the order entry configuration means further comprises global variable means for accessing the end item data structure means and the lower level item data structure means and for temporarily storing a value for subsequent use by the system.

15. The system of claim 3 wherein the manufacturing configuration means further comprises global variable means for accessing the end item data structure means and the lower level item data structure means and for temporarily storing a value for subsequent use by the system.

16. The system of claim 6 wherein the pricing configuration means further comprises global variable means for accessing the end item data structure means and the lower level item data structure means and for temporarily storing a value for subsequent use by the system.

17. The system of claim 1 wherein the manufacturing configuration means comprises multi-plant means for determining and specifying, for each of the custom work orders, which plant among a plurality of plants will be assigned to receive at least one of the custom work orders to construct an item corresponding to the custom work order.

18. The system of claim 3 wherein the order entry configuration means further comprises secondary variable means for accessing only one particular data structure within the options storage means and for temporarily storing a value for subsequent use by the system.

19. The system of claim 3 wherein the manufacturing configuration means further comprises secondary variable means for accessing only one particular data structure within the options storage means and for temporarily storing a value for subsequent use by the system.

20. The system of claim 6 wherein the pricing configuration means further comprises secondary variable means for accessing only one particular data structure within the options storage means and for temporarily storing a value for subsequent use by the system.

21. The system of claim 3 wherein the order entry configuration means further comprises condition rule means for suspending the releasing by the firing means of one or more order entry rules while a user-determined condition is not satisfied.

22. The system of claim 3 wherein the manufacturing configuration means further comprises condition rule means for suspending the releasing by the firing means of one or more manufacturing rules while a user-determined condition is not satisfied.

23. The system of claim 6 wherein the pricing configuration means further comprises condition rule means for suspending the releasing by the firing means of one or more pricing rules while a user-determined condition is not satisfied.

24. The system of claim 6 wherein the pricing configuration means further comprises price detail means for generating a price value for selected elements of the end item.

25. The system of claim 3 wherein the manufacturing configuration means further comprises comment rule means for associating a user-defined comment with at least one of the custom work orders.

26. The system of claim 3 wherein the order entry configuration means and the manufacturing configuration means further comprise rule syntax means for processing a first variable and a second variable according to an operation defined by an operand within each of the order entry rules and the manufacturing rules.

27. The system of claim 3 wherein the order entry configuration means and the manufacturing configuration means further comprise rule syntax means for processing a variable within each of the order entry rules and the manufacturing rules.

28. The system of claim 27 wherein the rule syntax means comprises variable means for processing at least one of the variables selected from the following group of variables: option variable, user-defined constant, secondary variable, global variable, validation table variable, matrix variable, program variable, internal database variable, or multiple options table.

29. The system of claim 28 wherein:
a) the order entry configuration means further comprises matrix variable means for generating a result value based upon one or more of the following keys: the answers, the secondary variable, the global variable, or the internal database variable; and
b) the matrix variable means comprises means for receiving the keys and for generating a unique result value corresponding to each combination of values of the keys.

30. The system of claim 28 wherein:
a) the manufacturing configuration means further comprise matrix variable means for generating a result value based upon one or more of the following keys: the answers, the secondary variable, the global variable, or the internal database variable; and
b) the matrix variable means comprises means for receiving the keys and for generating a unique result value corresponding to each combination of values of the keys.

31. The system of claim 26 wherein the rule syntax means comprises variable means for processing at least one of the variables selected from the following group of variables: option variable, user-defined constant, secondary variable, global variable, validation table variable, matrix variable, program variable, internal database variable, or multiple options table.

32. The system of claim 26 wherein the rule syntax means comprises operand means for processing the first variable and the second variable according to at least one of the operations selected from the following group of operations: less than, less than or equal, addition, subtraction, division, multiplication, greater than, greater than or equal to, equal to, round down, round up, concatenate between one and four characters, element of multiple option table, element of validation table, logical AND, logical OR, logical IF, substring after, or substring before.

33. The system of claim 31 wherein:
a) the order entry configuration means further comprises matrix variable means for generating a result value based upon one or more of the following keys: the answers, the secondary variable, the global variable, or the internal database variable; and
b) the matrix variable means comprises means for receiving the keys and for generating a unique result value corresponding to each combination of values of the keys.

34. The system of claim 31 wherein:
a) the manufacturing configuration means further comprises matrix variable means for generating a result value based upon one or more of the following keys: the answers, the secondary variable, the global variable, or the internal database variable; and
b) the matrix variable means comprises means for receiving the keys and for generating a unique result value corresponding to each combination of values of the keys.

35. The system of claim 6 wherein the pricing configuration means further comprises rule syntax means for processing a first variable and a second variable and an operand within each of the pricing rules.

36. The system of claim 6 wherein the pricing configuration means further comprises rule syntax means for processing a variable within each of the pricing rules.

37. The system of claim 36 wherein the rule syntax means comprises variable means for processing at least one of the variables selected from the following group of variables: option variable, user-defined constant, secondary variable, global variable, validation table variable, matrix variable, program variable, internal database variable, or multiple options table.

38. The system of claim 37 wherein:
a) the pricing configuration means further comprises matrix variable means for generating a result value based upon one or more of the following keys: the answers, the secondary variable, the global variable, or the internal database variable; and
b) the matrix variable means comprises means for receiving the keys and for generating a unique result value corresponding to each combination of values of the keys.

39. The system of claim 35 wherein the rule syntax means comprises variable means for processing at least one of the variables selected from the following group of variables: option variable, user-defined constant, secondary variable, global variable, validation table variable, matrix variable, program variable, internal database variable, or multiple options table.

40. The system of claim 35 wherein the rule syntax means comprises operand means for processing the first and second variables according to at least one of the operations selected from the following group of operations: less than, less than or equal, addition, subtraction, division, multiplication, greater than, greater than or equal, equal to, round down, round up, concatenate between one and four characters, element of multiple option table, element of validation table, logical AND, logical OR, logical IF, substring after, or substring before.

41. The system of claim 39 wherein:
a) the pricing configuration means further comprises value based upon one or more of the following keys: the answers, the secondary variable, the global variable, or the internal database variable; and
b) the matrix variable means comprises means for receiving the keys and for generating a unique result value corresponding to each combination of values of the keys.

42. The system of claim 2, further comprising knowledge acquisition means for gathering data for the order entry rules and the manufacturing rules.

43. The system of claim 5, further comprising knowledge acquisition means for generating the pricing rules.

44. The system of claim 3 wherein the order entry configuration means further comprises explanation means for outputting results of the order entry rules executed by the execution means during the process of obtaining the sets of answers and for outputting results of the manufacturing rules executed by the execution means during the process of generating the custom work orders, the explanation means comprising means for listing rules that were fires, for specifying a firing sequence of the rules that were fired, and for listing results of the rules that were fired.

45. The system of claim 6 wherein the pricing configuration means further comprises explanation means for outputting results of the pricing rules executed by the execution means during the process of generating the custom price, the explanation means comprising means for listing rules that were fired, for specifying a firing sequence of the that rules were fired, and for listing results of the rules that were fired.

46. The system of claim 6 wherein the pricing configuration means comprises finalized price means for calculating a finalized price for the end item and for inputting the finalized price into a data storage.

47. The system of claim 3 wherein the manufacturing configuration means comprises cost roll-up means for adding a cost of each lower-level item into a cumulative total cost during the process of generating the custom work orders and for adding a cost of assembling the end item and assembling the lower-level items into the total cost.

48. The system of claim 1 wherein the manufacturing configuration means comprises matrix maintenance means for defining a matrix variable having user-defined input keys and a unique user-defined result value for each combination of the input keys, the matrix maintenance means comprising means for inputting the user-defined keys and the user-defined result values.

49. The system of claim 1 wherein the order entry means comprises matrix maintenance means for defining a matrix variable having user-defined input keys and a unique user-defined result value for each combination of the input keys, the matrix maintenance means comprising means for inputting the user-defined keys and the user-defined result values.

50. The system of claim 4 wherein the pricing configuration means comprises matrix maintenance means for defining a matrix variable having user-defined input keys and a unique user-defined result value for each combination of the input keys, the matrix maintenance means comprising means for inputting the user-defined keys and the user-defined result values.

51. The system of claim 3 wherein the input means comprises rule-determined input means for modifying a plurality of sets of rule-determined answers to the questions.

52. The system of claim 3 wherein the manufacturing configuration means comprises rule-determined input means for inputting a plurality of sets of rule-determined answers to the questions.

53. The system of claim 3 wherein the manufacturing configuration means comprises rule-determined input means for modifying a plurality of sets of rule-determined answers to the questions.

54. The system of claim 6 wherein the pricing configuration means comprises rule-determined input means for inputting a plurality of sets of rule-determined answers to the questions.

55. The system of claim 6 wherein the pricing configuration means comprises rule-determined input means for modifying a plurality of sets of rule-determined answers to the questions.

56. The system of claim 1, further comprising inventory management means for identifying parts that have been configured by the system, for which a work order has been completed, and which have been received into an inventory.

57. The system of claim 56 wherein the inventory management means comprises configuration code means for assigning a unique configuration code to each of the parts.

58. A process for dynamically constructing a plurality of custom work orders for an end item and for a plurality of lower-level configurable items necessary for manufacturing the end item, the process comprising:
a) processing a first set of option values for the end item and the lower-level items comprising the end item;
b) executing a recursive process of gathering a second set of option values for each lower-level configurable item identified while processing the first and second sets of option values until processing of the second sets of option values for all the lower-level configurable items is complete, the recursive processing comprising the steps of:
  1) suspending processing of a parent set of option values for a parent configurable item when a lower-level configurable item is identified;
  2) transferring control to a processing of a lower-level set of option values for the identified lower-level configurable item;
  3) processing the lower-level set of option values for the identified lower-level configurable item; and
  4) returning to the processing of the parent set of option values for the parent configurable item; and
c) generating a plurality of custom work orders for the end item and the lower-level configurable items based upon data available to the process which includes the sets of option values.

59. The process of claim 58 wherein steps (a) and (b) each comprise the substep of processing order entry rules, comprising the steps of:
  1) firing the order entry rules for execution;
  2) comparing a condition of each of the order entry rules with data available to the process; and
  3) executing an action of each of the order entry rules only if the condition of the corresponding rule is satisfied and the rule has been released by the firing step (1).

60. The process of claim 58 wherein step (c) comprises the substep of processing manufacturing rules, comprising the steps of:
  1) firing the manufacturing rules for execution;
  2) comparing a condition of each of the manufacturing rules with data available to the process; and
  3) executing an action of each of the manufacturing rules only if the condition of the corresponding rule is satisfied and the rule has been released by the firing step (1).

* * * * *